United States Patent
Lubeck et al.

(10) Patent No.: US 10,565,601 B2
(45) Date of Patent: Feb. 18, 2020

(54) METHODS AND APPARATUS TO IDENTIFY NON-TRADITIONAL ASSET-BUNDLES FOR PURCHASING GROUPS USING SOCIAL MEDIA

(71) Applicant: The Nielsen Company (US), LLC, Schaumburg, IL (US)

(72) Inventors: Lauren Elizabeth Lubeck, New York, NY (US); Michael Richard Sheppard, Brooklyn, NY (US); Alejandro Terrazas, Santa Cruz, CA (US); Samantha Dawson Edds, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 836 days.

(21) Appl. No.: 14/634,268

(22) Filed: Feb. 27, 2015

(65) Prior Publication Data
US 2016/0253685 A1    Sep. 1, 2016

(51) Int. Cl.
*G06Q 30/02* (2012.01)
*H04L 12/58* (2006.01)
*H04L 29/08* (2006.01)
*G06Q 50/00* (2012.01)
*G06F 16/28* (2019.01)

(52) U.S. Cl.
CPC ....... *G06Q 30/0201* (2013.01); *G06F 16/285* (2019.01); *G06Q 50/01* (2013.01); *H04L 51/32* (2013.01); *H04L 67/306* (2013.01)

(58) Field of Classification Search
None
See application file for complete search history.

(56) References Cited

U.S. PATENT DOCUMENTS

| 6,035,287 A | 3/2000 | Stallaert et al. |
| 6,839,682 B1 | 1/2005 | Blume et al. |
| (Continued) | | |

FOREIGN PATENT DOCUMENTS

| WO | WO-2013025227 A1 * | 2/2013 | ......... G06Q 30/0201 |
| WO | WO-2013078640 A1 * | 6/2013 | |
| WO | WO-2013126648 A1 * | 8/2013 | |

OTHER PUBLICATIONS

Zhang, Yongzheng, and Marco Pennacchiotti. "Predicting purchase behaviors from social media." Proceedings of the 22nd international conference on World Wide Web. ACM, 2013. (Year: 2013).*
(Continued)

*Primary Examiner* — Thomas L Mansfield
*Assistant Examiner* — Derick J Holzmacher
(74) *Attorney, Agent, or Firm* — Hanley, Flight & Zimmerman, LLC

(57) ABSTRACT

Methods, apparatus, systems and articles of manufacture are disclosed to identify non-traditional asset-bundles for purchasing groups using social media. An example method includes identifying an asset-bundle in a social media message and generating a profile for a user associated with the social media message. The example method also includes identifying a plurality of social media messages posted by cohorts of the user based on the generated profile and classifying the asset-bundle based on occurrences of the asset-bundle in the plurality of social media messages.

26 Claims, 15 Drawing Sheets

(56) References Cited

U.S. PATENT DOCUMENTS

| | | | |
|---|---|---|---|
| 7,124,106 | B1 | 10/2006 | Stallaert et al. |
| 7,571,121 | B2 | 8/2009 | Bezos et al. |
| 7,970,660 | B2 | 6/2011 | Bezos et al. |
| 8,090,625 | B2* | 1/2012 | Yi .................. G06Q 30/02 705/26.64 |
| 8,234,183 | B2* | 7/2012 | Smith ............ G06Q 30/0629 705/26.64 |
| 8,631,122 | B2 | 1/2014 | Kadam et al. |
| 8,751,461 | B2 | 6/2014 | Abraham et al. |
| 8,762,302 | B1* | 6/2014 | Spivack .............. G06N 5/046 706/12 |
| 8,909,569 | B2* | 12/2014 | Spivack .............. G06N 5/046 706/12 |
| 8,935,713 | B1 | 1/2015 | Gabel et al. |
| 8,954,536 | B2 | 2/2015 | Kalus et al. |
| 2006/0173957 | A1* | 8/2006 | Robinson ............ G06Q 10/10 709/204 |
| 2007/0214097 | A1* | 9/2007 | Parsons ............. G06Q 10/00 706/12 |
| 2008/0133488 | A1* | 6/2008 | Bandaru ............ G06F 16/951 |
| 2008/0133716 | A1* | 6/2008 | Rao ................. G06Q 30/08 709/220 |
| 2008/0275861 | A1* | 11/2008 | Baluja .............. G06N 5/02 |
| 2009/0055375 | A1* | 2/2009 | Oestlien ............ G06F 16/958 |
| 2009/0119173 | A1* | 5/2009 | Parsons ............ G06O 10/107 705/319 |
| 2009/0187464 | A1 | 7/2009 | Bai et al. |
| 2009/0271417 | A1* | 10/2009 | Toebes ............ G06F 16/9537 |
| 2010/0121707 | A1* | 5/2010 | Goeldi ............. G06Q 10/00 705/14.49 |
| 2010/0262477 | A1* | 10/2010 | Hillerbrand ....... G06Q 30/02 705/14.16 |
| 2010/0306249 | A1* | 12/2010 | Hill ................. G06Q 30/02 707/769 |
| 2011/0282860 | A1* | 11/2011 | Baarman ........... G06F 16/951 707/709 |
| 2011/0288907 | A1* | 11/2011 | Harvey ............ G06Q 10/0639 705/7.29 |
| 2011/0313915 | A1 | 12/2011 | Tang |
| 2012/0072469 | A1* | 3/2012 | Perez ............. G06Q 30/0201 707/810 |
| 2012/0185544 | A1* | 7/2012 | Chang ............. G06Q 50/01 709/206 |
| 2012/0290660 | A1* | 11/2012 | Rao ................ G06Q 30/08 709/204 |
| 2013/0031176 | A1 | 1/2013 | Shih et al. |
| 2013/0138506 | A1* | 5/2013 | Zhu ............... G06Q 30/0241 705/14.53 |
| 2013/0290317 | A1* | 10/2013 | Spivack .......... G06F 17/275 707/723 |
| 2013/0298038 | A1* | 11/2013 | Spivack .......... H04L 65/403 715/753 |
| 2013/0340089 | A1* | 12/2013 | Steinberg ........ H04L 63/10 726/27 |
| 2014/0019542 | A1* | 1/2014 | Rao ............... H04L 67/306 709/204 |
| 2014/0040281 | A1* | 2/2014 | Spivack .......... G06F 16/24578 707/748 |
| 2014/0040387 | A1* | 2/2014 | Spivack .......... G06F 16/24578 709/206 |
| 2014/0067478 | A1 | 3/2014 | Zenor |
| 2014/0067596 | A1* | 3/2014 | McGovern ....... G06Q 30/02 705/26.7 |
| 2014/0088952 | A1* | 3/2014 | Fife .............. G06F 17/27 704/9 |
| 2014/0129331 | A1* | 5/2014 | Spivack ......... G06Q 30/0269 705/14.53 |
| 2014/0136544 | A1* | 5/2014 | Spivack ......... G06F 17/275 707/741 |
| 2014/0156761 | A1* | 6/2014 | Heffernan ...... H04L 51/32 709/206 |
| 2014/0173642 | A1 | 6/2014 | Vinson et al. |
| 2014/0280551 | A1 | 9/2014 | Byrd Vallieres de St. Real et al. |
| 2014/0344261 | A1* | 11/2014 | Navta ............ G06F 16/951 707/723 |
| 2015/0067075 | A1 | 3/2015 | Sheppard et al. |
| 2015/0256636 | A1* | 9/2015 | Spivack ......... G06Q 10/10 715/736 |

OTHER PUBLICATIONS

Li, Yung-Ming, Chia-Ling Chou, and Lien-Fa Lin. "A social recommender mechanism for location-based group commerce." Information Sciences 274 (2014): 125-142. (Year: 2014).*

Wang, Xia, Chunling Yu, and Yujie Wei. "Social media peer communication and impacts on purchase intentions: A consumer socialization framework." Journal of interactive marketing 26.4 (2012): 198-208. (Year: 2012).*

U.S. Appl. No. 14/584,436, "Methods and Apparatus to Estimate Demographics of an Audience of a Media Event Using Social Media Message Sentiment," filed Dec. 29, 2014, 86 pages.

Stelter, "Nielsen to Measure Twitter Chatter About TV Shows," The New York Times, Oct. 6, 2013, 3 pages retrieved from <http://www.nytimes.com/2013/10/07/business/media/nielsen-to-measure-twitter-chatter-about-tv.html>.

Creegan, "Can Twitter data explain Sharknado TV appeal?"CNBC.com, Aug. 15, 2013, 5 pages, retrieved from <http://www.cnbc.com/id/100956943>.

"The Follow-Back: Understanding the Two-Way Causal Influence Between Twitter Activity and TV Viewership," The Nielsen Company (US), LLC, Aug. 6, 2013, 5 pages, retrieved from <http://www.nielsen.com/us/en/insights/news/2013/the-follow-back-understanding-the-two-way-causal-influence-betw.html>.

Silver et al., "How to Tell Someone's Age When All You Know Is Her Name," FiveThirtyEight, May 29, 2014, 10 pages, retrieved from <http://fivethirtyeight.com/features/how-to-tell-someones-age-when-all-you-know-is-her-name/#fn-1>.

Parry, "6 Tools to Manage Your Twitter Followers," Search Engine Watch, May 21, 2012, retrieved from <http://searchenginewatch.com/article/2175789/6-Tools-to-Manage-Your-Twitter-Followers>, retrieved on Mar. 7, 2014 (4 pages).

* cited by examiner

300 ⤴

| USER IDENTIFIER (310) | AGE (320) | GENDER (330) |
|---|---|---|
| @USER-123 | 32 | F |
| @WATER-FAN | 25 | M |
| @USER-ABC | 40 | M |
| ... | ... | ... |

340 → @USER-123 row
350 → @WATER-FAN row
360 → @USER-ABC row

DEMOGRAPHIC INFORMATION ASSOCIATED WITH A USER IDENTIFIER

FIG. 3

| MESSAGE ID 410 | MESSAGE POSTING TIMESTAMP 420 | MESSAGE 430 | MEDIA INCLUDED? 440 | POSTING USER 450 |
|---|---|---|---|---|
| 0001 | 1/20/2015 8:15 PM | JUST GOT MY BIRTHDAY GIFTS! | YES | @USER-123 |
| 0002 | 1/20/2015 8:17 PM | ANOTHER AVERAGE EPISODE OF #SCANDAL | NO | @USER-123 |
| 0003 | 1/20/2015 9:15 PM | CAN'T WAIT TO TRY THESE OUT WHEN I GO SCUBA DIVING NEXT WEEK! | YES | @WATER-FAN |
| ... | ... | ... | ... | ... |

460 → (row 0001)
470 → (row 0002)
480 → (row 0003)

400

SOCIAL MEDIA MESSAGES POSTED BY USERS

FIG. 4

| MESSAGE ID | MESSAGE | MESSAGE POSTING TIMESTAMP | IMPRESSION COUNT | AGE 20-29 | AGE 30-39 | AGE 40-49 | MALE | FEMALE |
|---|---|---|---|---|---|---|---|---|
| 0001 | JUST GOT MY BIRTHDAY GIFTS! | 1/20/2015 8:15 PM | 22000 | 18% | 20% | 16% | 40% | 60% |
| 0002 | ANOTHER AVERAGE EPISODE OF #SCANDAL | 1/20/2015 8:17 PM | 10000 | 18% | 30% | 13% | 30% | 70% |
| 0003 | CAN'T WAIT TO TRY THESE OUT WHEN I GO SNORKELING NEXT WEEK! | 1/20/2015 9:15 PM | 18000 | 65% | 22% | 18% | 65% | 45% |
| ... | ... | ... | ... | ... | ... | ... | ... | ... |

QUERY RESPONSES

| | 610 | 620 | 630 |
|---|---|---|---|
| | ASSET IDENTIFIER | ASSET KEYWORD(S) | ASSET CATEGORY |
| 640 | RUNNING SHOES | RUNNING; SHOES; SPEED; AGILITY | FOOTWEAR |
| 650 | SCUBA DIVING | SCUBA; DIVING; WATER; UNDERWATER; OXYGEN | SERVICE |
| 660 | FLIP-FLOPS | FLIP-FLOPS; CASUAL; SANDALS; BEACH | FOOTWEAR |
| 670 | COUCH | COUCH; COMFORTABLE; CHAIR; RECLINE | FURNITURE |
| 680 | EARRINGS | EARS; HOOPS; JEWELRY; CELEBRATIONS | JEWELRY |
| | ... | ... | ... |

ASSET PROFILE INFORMATION

FIG. 6

| MESSAGE ID (710) | POSTING USER (720) | ASSET #1 (730) | ASSET #2 (740) | ASSET-BUNDLE CLASSIFICATION (750) |
|---|---|---|---|---|
| 0001 | @USER-123 | EARRINGS | RUNNING SHOES | NON-TRADITIONAL |
| 0003 | @WATER-FAN | FLIP-FLOPS | SCUBA DIVING | TRADITIONAL |
| 0003 | @WATER-FAN | FLIP-FLOPS | COUCH | COINCIDENCE |
| 0003 | @WATER-FAN | SCUBA DIVING | COUCH | COINCIDENCE |
| 0004 | @USER-ABC | FLIP-FLOPS | SCUBA DIVING | TRADITIONAL |
| 0005 | @USER-ABC | EARRINGS | RUNNING SHOES | COINCIDENCE |
| ... | ... | ... | ... | ... |

IDENTIFIED ASSET-BUNDLES

| POSTING USER | POSTING USER PROFILE | POSTED MESSAGE(S) ID |
|---|---|---|
| @USER-123 | FEMALE AGE 30-39 | 0001, 0002 |
| @WATER-FAN | MALE AGE 20-29 | 0003 |
| ... | ... | ... |

810 — POSTING USER
820 — POSTING USER PROFILE
830 — POSTED MESSAGE(S) ID
840 — @USER-123 row
850 — @WATER-FAN row

USER PROFILES

FIG. 8

METHODS AND APPARATUS TO IDENTIFY NON-TRADITIONAL ASSET-BUNDLES FOR PURCHASING GROUPS USING SOCIAL MEDIA

FIELD OF THE DISCLOSURE

This disclosure relates generally to audience measurement, and, more particularly, to methods and apparatus to identify non-traditional asset-bundles for purchasing groups using social media.

BACKGROUND

Audience measurement of media (e.g., any type of content and/or advertisements such as broadcast television and/or radio, stored audio and/or video played back from a memory such as a digital video recorder or a digital video disc, a webpage, audio and/or video presented (e.g., streamed) via the Internet, a video game, etc.) often involves collection of media identifying information (e.g., signature(s), fingerprint(s), code(s), tuned channel identification information, time of exposure information, etc.). Such audience measurement efforts typically also involve the collection of people data (e.g., user identifier(s), demographic data associated with audience member(s), etc.). The media identifying information and the people data can be combined to generate, for example, media exposure data indicative of amount(s) and/or type(s) of people that were exposed to specific piece(s) of media.

BRIEF DESCRIPTION OF THE DRAWINGS

FIG. 3 is a data table that may be stored by the example social media server of FIGS. 1 and/or 2 to store demographic information in associated with a user.

FIG. 4 is an example data table that may be stored by the example social media server of FIGS. 1 and/or 2 to store social media messages.

FIG. 5 is an example data table representing query responses that may be supplied to the example central facility of FIGS. 1 and/or 2 by the example social media server of FIGS. 1 and/or 2.

FIG. 6 is an example data table that may be stored by the example central facility of FIGS. 1 and/or 2 representing asset keywords and asset categories associated with different assets.

FIG. 7 is an example data table that may be stored by the example central facility of FIGS. 1 and/or 2 to store identified asset-bundles referenced in social media messages of interest.

FIG. 8 is an example data table that may be stored by the example central facility of FIGS. 1 and/or 2 representing profiles generated for profiles that posted social media messages of interest.

Wherever possible, the same reference numbers will be used throughout the drawing(s) and accompanying written description to refer to the same or like parts.

DETAILED DESCRIPTION

Figure 1:
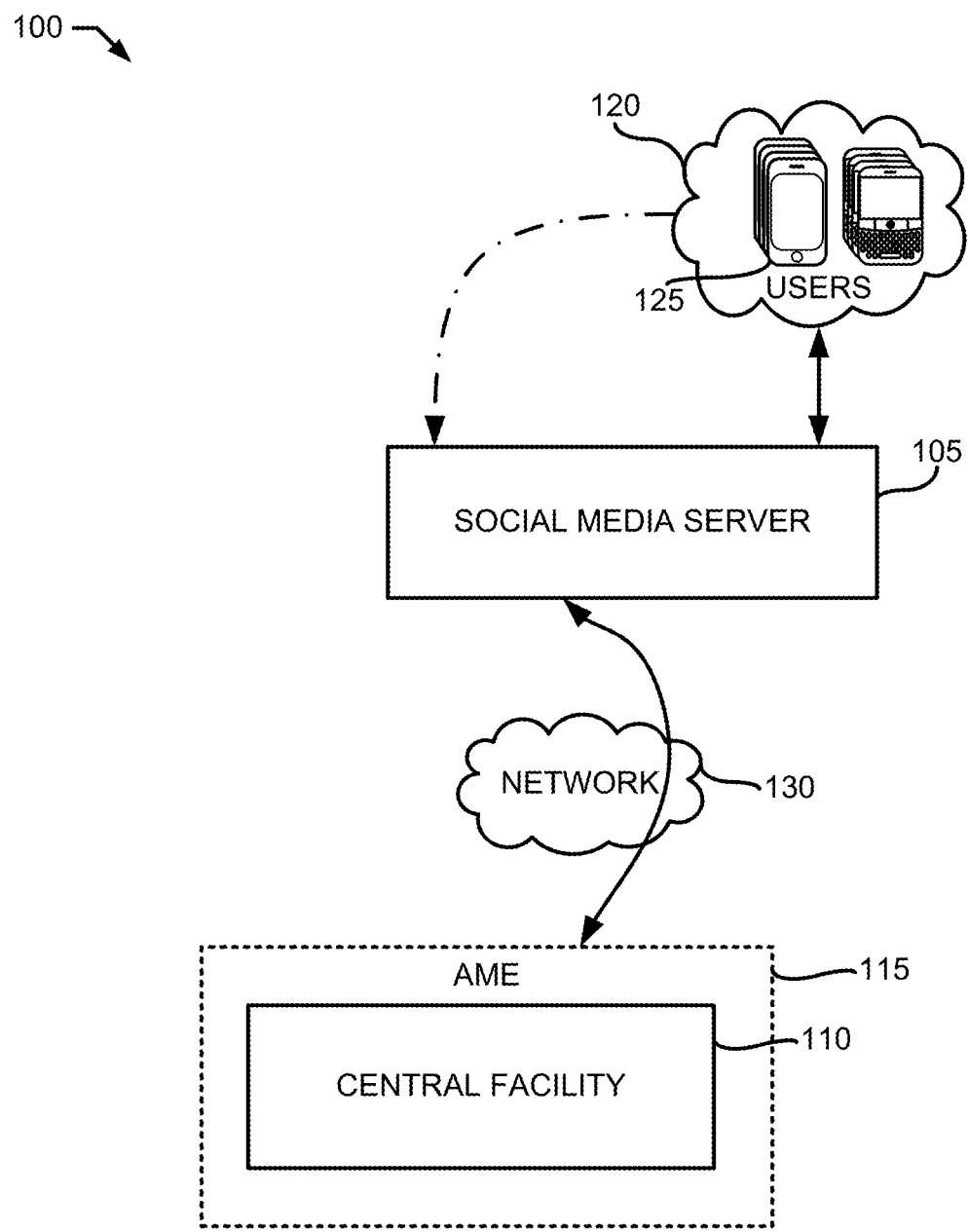
FIG. 1 is a diagram of an example environment in which a system constructed in accordance with the teachings of this disclosure operates to identify non-traditional asset-bundles for purchasing groups using social media.

Example methods, systems and apparatus disclosed herein may be used to identify assets commonly purchased by people. In some examples, messages posted by users of social media are analyzed to identify unusual asset combinations (e.g., non-traditional asset bundles). For example, techniques disclosed herein enable utilizing social media to discover and/or categorize traditional and non-traditional asset-bundles for purchasing groups.

Social messaging has become a widely used medium in which users disseminate and receive information. Online social messaging services (such as Twitter, Facebook, Instagram, etc.) enable users to send social media messages or instant messages to many users at once. Some social messaging services enable users to "follow" or "friend" other users (e.g., subscribe to receive messages sent by select users (e.g., via the Twitter® service), status updates (e.g., via the Facebook® service or Google+™ social service), etc.). For example, a user following (e.g., subscribed to, online friends with, etc.) a celebrity in the Twitter® service may receive indications via a client application (e.g., the TweetDeck® client application or any other social media messaging client application) when the celebrity sends or posts a social media message.

Social media messages (sometimes referred to herein as "messages," "statuses," "texts" or "tweets") may be used to convey many different types of information. In some examples, social media messages are used to relay general information about a user. For example, a message sender may send a social media message indicating that they are bored. In some examples, social media messages are used to convey information regarding media, a media event, a product, and/or a service. For example, a message sender may convey (e.g., self-report) a social media message indicating that the message sender is watching a certain television program, listening to a certain song, or just purchased a certain book. Social media messages may include different types of media such as, for example, images, moving images, video, etc. and/or text such as, for example, words, abbreviations, acronyms, hashtags, alphanumeric strings, etc. Asset-regarding social media messages are social media messages that are disseminated to a mass audience and indicate exposure to the asset. In some examples disclosed herein, social media messages are collected and then filtered to identify asset-regarding social media messages.

Certain assets (e.g., media, media events, products and/or services) are commonly paired together by people. Traditional asset-bundles include pairings of assets within similar categories. For example, a person buying peanut butter typically also purchases jelly (e.g., two condiments or spreads). Similarly, a person purchasing tickets to a movie may also purchase popcorn or candy (e.g., a media event and product(s) related to the media event). In contrast, non-traditional asset-bundles may include pairings of cross-category assets. For example, during the holiday season, it may be common to see social media messages referencing a Tiffany Blue Box (e.g., jewelry) with matching colored running shoes (e.g., active wear) next to the box. By their nature, such unusual (or "funky") pairings of cross-category assets may be difficult to identify, but helpful for improving marketing for the respective assets.

Examples disclosed herein use social media to classify asset-bundles. For example, a set of posted messages regarding (e.g., corresponding to, mentioning, referencing, etc.) a first asset (e.g., a pair of running shoes) are identified. Using image recognition techniques and/or natural language processing techniques, examples disclosed herein identify social media messages regarding two or more assets (e.g., asset-bundle regarding social media messages. Examples disclosed herein identify a user associated with the asset-bundle regarding social media message and generate a profile (e.g., a socio-demographic profile) (sometimes referred to herein as "a socio-demographic estimation," a "socio-demographic group," a "demographic segment," "a demographic bucket," a "demographic composition," a "demographic pool" and/or "market trends") for the user. For example, examples disclosed herein analyze pictures, products, location tags, captions, followers, tagged accounts, etc. associated with the user (e.g., posted by the user, "liked" by the user, etc.) to derive information indicative of the user. In some examples disclosed herein, the generated profile may include demographic information about the user (e.g., age, gender, geographic location, income, ethnicity, etc.), likes and/or interests of the user (e.g., likes soda and puppies) and/or habits of the user (purchases a smoothie after working-out at the gym). Once a profile for a user is generated, other users may be identified with the same and/or similar profile. For example, cohorts of the user may be identified by identifying profiles of other users that share (e.g., have in common) a characteristic element included in the profile.

Examples disclosed herein classify the identified asset-bundles based on a subset of the generated user profiles. For example, examples disclosed herein identify a subset of the generated profiles that have the same and/or similar characteristic elements (e.g., demographics, likes, interests, habits, etc.). In some disclosed examples, the subset of the generated profiles is selected based on constraints specified for a purchasing group. A purchasing group may include any combination of characteristic elements. For example, a first purchasing group may include users who are female age 20-29, a second purchasing group may include users who live in California, a third purchasing group may include users who frequent gyms and like coffee, etc.

Examples disclosed herein identify social media messages of interest by identifying asset-bundle regarding social media messages that were posted by the users included in the purchasing group. In some disclosed examples, to classify an asset-bundle, the number of times the asset-bundle is referenced in the social media messages of interest (e.g., an asset-bundle count) is compared to thresholds. For example, if the asset-bundle count fails to satisfy a first threshold (e.g., a coincidence threshold), then the corresponding asset-bundle is classified a coincidental pairing. Using a coincidence threshold is advantageous because it ensures a meaningful number of occurrences (e.g., a statistically significant sample size) of an asset-bundle are used when classifying the asset-bundle.

When an asset-bundle is not a coincidental pairing (e.g., the corresponding asset-bundle count meets and/or exceeds the coincidence threshold), examples disclosed herein determine whether the asset-bundle is a traditional asset-bundle and/or a non-traditional asset-bundle. As described above, in some disclosed examples, if the assets in the asset-bundle are cross-category in relation, the asset-bundle is classified a non-traditional asset-bundle. For example, an asset-bundle including scuba diving lessons (e.g., a service) and flip-flops (e.g., a product) may be classified as non-traditional because the asset-bundle includes a first asset that is a service related to water activities and a second asset that is a product related to footwear. Examples disclosed herein classify asset-bundles in which the assets in the asset-bundle are the same and/or similar categories in relation. For example, an asset-bundle including scuba diving lessons and swim fins may be classified as traditional since the asset bundle includes a first asset that is a service related to water activities and a second asset that is a product related to water activities.

In some disclosed examples, the distinction between traditional and non-traditional asset-bundles may depend on the asset-bundle count for the asset-bundle. For example, examples disclosed herein may classify an asset-bundle with an asset-bundle count that satisfies the coincidence threshold but does not satisfy a traditional threshold as non-traditional. When an asset-bundle count satisfies the coincident threshold and the traditional threshold (e.g., the number of occurrences of the corresponding asset-bundle meets and/or exceeds the traditional threshold), examples disclosed herein may classify the corresponding asset-bundle a traditional asset-bundle.

Examples disclosed herein may utilize the asset-bundle classifications for one or more purchasing groups to identify techniques for improving marketing for the respective assets. For example, examples disclosed herein may process the classified asset-bundles and determine a comparison set between brands (e.g., purchasers of running shoes and running shorts have a high likelihood of buying Acme brand shoes and shorts), improve marketing for products via exposure to more personal sponsored media (e.g., presenting a user who purchases dog food and carbonated drinks with an advertisement for soda with puppies in the image), provide related reviews (e.g., "If you like these chips, you may also like this salsa!"), provide product substitutions (e.g., "Out of eggs and oil? Why don't you try diet soda instead?") and/or appeal to fan-bases (e.g., a restaurant incorporating a trending sauce or ingredient into their entrees).

FIG. 1 is a diagram of an example environment in which a system 100 constructed in accordance with the teachings of this disclosure operates to identify non-traditional asset-bundles for purchasing groups using social media. The example system 100 of FIG. 1 includes a social media server 105 and a central facility 110 operated by an audience measurement entity (AME) 115. The example AME 115 of the illustrated example of FIG. 1 is an entity such as The Nielsen Company (US), LLC that monitors and/or reports exposure to assets and operates as a neutral third party. The example AME 115 of FIG. 1 operates the central facility 110 to identify asset-bundles in social media and to classify the identified asset-bundles as, for example, traditional asset-bundles, non-traditional asset-bundles and/or coincidental pairings.

The social media server 105 provides social media services to users 120 of the social media server 105. As used herein, the term social media services is defined to be a service provided to users to enable users to share information (e.g., text, images, data, etc.) in a virtual community and/or network. Example social media services may include, for example, Internet forums (e.g., a message board), blogs, micro blogs (e.g., Twitter), social networks (e.g., Facebook, LinkedIn, Instagram, etc.), etc.

The example users 120 of the illustrated example of FIG. 1 are users of a social media service provided by the social media server 105. In the illustrated example, the example users 120 access the social media service using a media device 125 such as a mobile device (e.g., a cellular phone, a smartphone, a tablet, etc.). However, the social media server 105 may be accessed in any other fashion such as, for example, using a laptop, a smart television, an in-vehicle infotainment system, etc. The example social media server 105 of the illustrated example of FIG. 1 records social media messages posted by users of the social media service and a timestamp(s) associated with the posting of the message(s).

The example social media server 105 of the illustrated example of FIG. 1 receives one or more queries from the AME 115 via a network 130. The example network 130 of the illustrated example of FIG. 1 is the Internet. However, the example network 130 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 130 enables the central facility 110 to be in communication with the social media server 105. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The central facility 110 transmits the queries to gather social media messages of interest at periodic intervals (e.g., every 24 hours, every Monday, etc.). In the illustrated example, the one or more queries indicate asset keywords, user identifiers and/or message identifiers. The asset keywords are keywords that are associated with particular assets (e.g., a pair of running shoes) and result in social media messages that are relevant to the particular asset being identified.

The example central facility 110 of the illustrated example of FIG. 1 inspects the social media messages returned by the social media server 105 for one or more assets mentioned in the social media messages. In the illustrated example, the central facility 110 utilizes image recognition to compare the identified patterns and/or shapes to known patterns and/or shapes to identify, for example, an asset referenced in the media of the social media message.

In the illustrated example, when the central facility 110 identifies two or more assets referenced by media included in a social media message, the social media message is an asset-bundle regarding social media message. The example central facility 110 stores information used for identifying asset-bundle regarding social media message, an asset and/or an asset-bundle in the asset-bundle regarding social media message in a database.

The example central facility 110 of the illustrated example of FIG. 1 classifies an asset-bundle of interest based on the number of times that the asset-bundle is referenced by users of interest. For example, if the asset-bundle count is less than a coincidence threshold, then the pairing of the assets in the asset-bundle by users in the purchasing group was a coincidental pairing. If the asset-bundle count satisfies the coincidence threshold, the example central facility 110 of the illustrated example of FIG. 1 then compares the asset-bundle count to a second threshold (e.g., a traditional threshold). When an asset-bundle count satisfies the traditional threshold, the central facility 110 classifies the asset-bundle a traditional asset-bundle, and when the asset-bundle count does not satisfy the traditional threshold, the central facility 110 classifies the asset-bundle a non-traditional asset-bundle.

Figure 2:
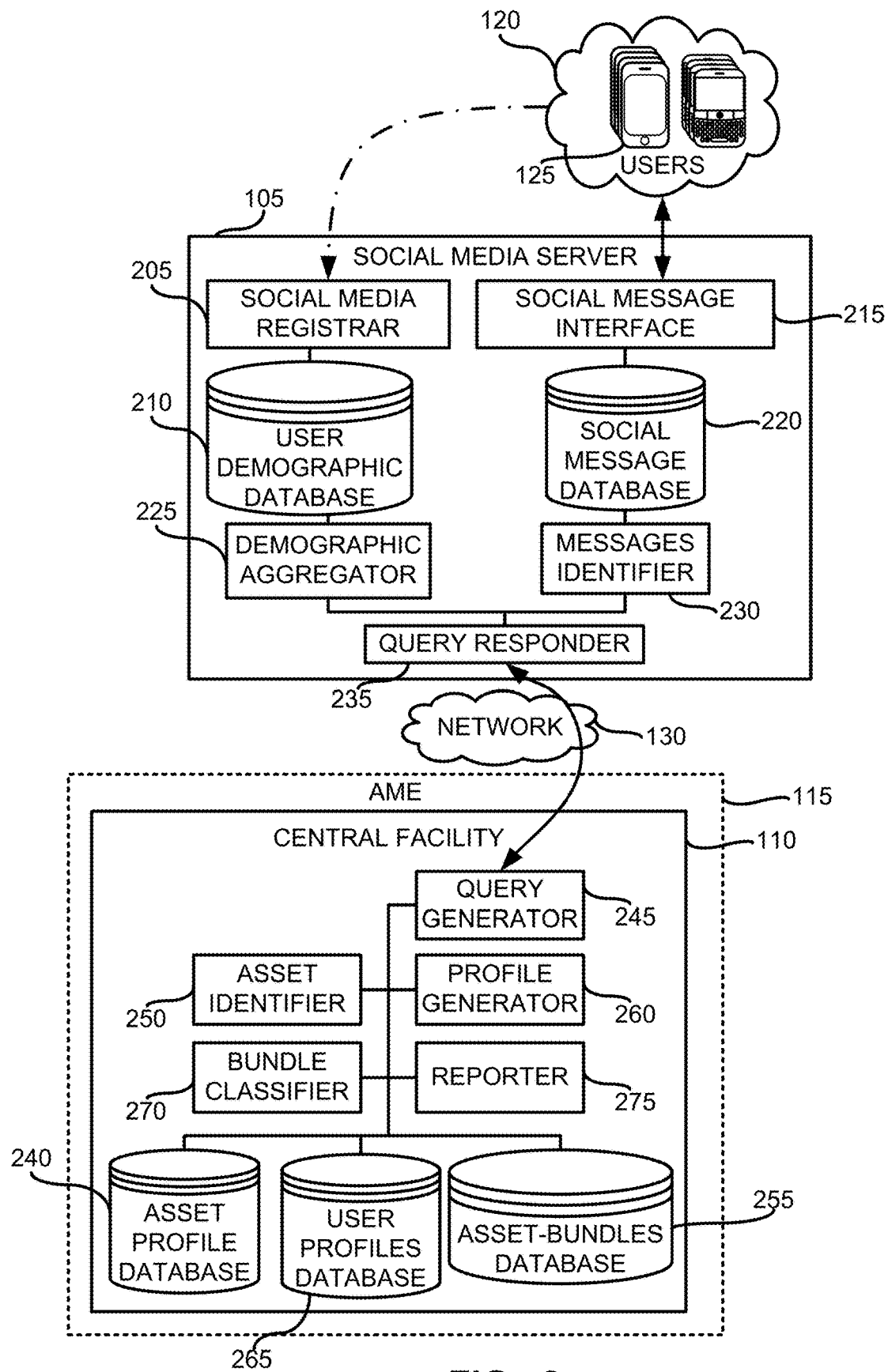
FIG. 2 is an example block diagram of the example environment of FIG. 1 in which a system constructed in accordance with the teachings of this disclosure operates to identify non-traditional asset-bundles for purchasing groups using social media.

FIG. 2 is a block diagram of an example environment in which the system 100 of FIG. 1 constructed in accordance with the teachings of this disclosure operates to identify non-traditional asset-bundles for purchasing groups using social media. The example system 100 of FIG. 2 includes the social media server 105 and the central facility 110 operated by the audience measurement entity (AME) 115 of FIG. 1. The social media server 105 provides social media services to users 120 of the social media server 105. As used herein, the term social media services is defined to be a service provided to users to enable users to share information (e.g., text, images, data, etc.) in a virtual community and/or network. Example social media services may include, for example, Internet forums (e.g., a message board), blogs, micro blogs (e.g., Twitter), social networks (e.g., Facebook, LinkedIn, Instagram, etc.), etc. The example social media server 105 of FIG. 2 includes a social media registrar 205, a user demographic database 210, a social message interface 215, a social message database 220, a demographic aggregator 225, a messages identifier 230, and a query responder 235.

The example social media server 105 receives queries from the central facility 110 via a network 130. The central facility 110 transmits the queries to gather social media messages of interest. The example central facility 110 includes an asset profile database 240, a query generator 245, an asset identifier 250, an asset-bundles database 255, a profile generator 260, a user profiles database 265, a bundle classifier 270 and a reporter 275.

The example users 120 of the illustrated example of FIG. 2 are users of a social media service provided by the social media server 105. In the illustrated example, the example users 120 access the social media service using a media device 125 such as a mobile device (e.g., a cellular phone, a smartphone, a tablet, etc.). However, the social media server 105 may be accessed in any other fashion such as, for example, using a laptop, a smart television, an in-vehicle infotainment system, etc. In the illustrated example, the user(s) 120 signs into an online social media service with a user identifier to read and/or convey (e.g., post, send, etc.) social media messages. Users may then follow other users (e.g., subscribe to messages of the other users) using the user identifier(s).

The example social media registrar 205 of the illustrated example of FIG. 2 receives demographic information from users when users sign up for the social media service. As used herein, demographic information includes, for example, a user's age, gender, geographic location, income, ethnicity, etc. The example social media registrar 205 receives the demographic information from the user by presenting the user with a webpage including a form and receiving a response from the user. However, any other approach to gathering the demographic information may additionally or alternatively be used such as, for example, via a telephone interview, an in-person interview, by having the user complete a survey (e.g., an on-line survey), etc. When the example social media registrar 205 has collected the demographic information, the demographic information is stored in the example user demographic database 210 in association with a user identifier of the user. An example data table 300 representing demographic information stored in association with the user identifier is shown in the illustrated example of FIG. 3.

The example user demographic database 210 of the illustrated example of FIG. 2 stores demographic information received via the example social media registrar 205 in association with user identifiers. Such association enables identification of demographic information associated with users who posted and/or received a social media message. The example user demographic database 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example user demographic database 210 may additionally or alternatively be implemented by one or more double data rate (DDR) memories, such as DDR, DDR2, DDR3, mobile DDR (mDDR), etc. The example user demographic database 210 may additionally or alternatively be implemented by one or more mass storage devices such as hard disk drive(s), compact disk drive(s), digital versatile disk drive(s), etc. While in the illustrated example the user demographic database 210 is illustrated as a single database, the user demographic database 210 may be implemented by any number and/or type(s) of databases.

The example social message interface 215 of the illustrated example of FIG. 2 enables users to post social media messages and/or receive social media messages posted to the social message service. For example, when the user 120 operates their media device 125, the social message interface 215 receives a social media message composed by the user 120. In examples disclosed herein, the social message interface 215 records social media messages that were received for posting in the social message database 220.

The example social message database 220 of the illustrated example of FIG. 2 records social media messages posted by users of the social media service and a timestamp(s) associated with the posting of the message(s). In some examples, a username of the user posting the social media message is stored. Storing the username of the posting user enables identification that the social media message should be presented to a user who is subscribed to the posting user.

An example data table 400 of the illustrated example of FIG. 4 illustrates example data that may be stored in the example social message database 220. In some examples, to enable identification of users who were presented with a particular message of interest, the social message database 220 also stores social media message exposure information. In some such examples, the social media message information may include a timestamp indicating the time of exposure and a user identifier to whom the social media message was presented. The example social message database 220 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example social message database 220 may additionally or alternatively be implemented by one or more double data rate (DDR) memories, such as DDR, DDR2, DDR3, mobile DDR (mDDR), etc. The example social message database 220 may additionally or alternatively be implemented by one or more mass storage devices such as hard disk drive(s), compact disk drive(s), digital versatile disk drive(s), etc. While in the illustrated example the social message database 220 is illustrated as a single database, the social message database 220 may be implemented by any number and/or type(s) of databases.

The example demographic aggregator 225 of the illustrated example of FIG. 2 aggregates demographic information for selected users in response to a query received by the query responder 235. An important aspect of any monitoring system is maintaining the privacy of those users who are monitored in accordance with their wishes. To that end, the social media server 105 does not provide user names identifying users who were presented with a social media message. Instead, the example demographic aggregator 225 summarizes demographic information of a list of identified users when a number of users identified in response to a query meets or exceeds a user threshold (e.g., one hundred users). Using a user threshold ensures that any one user in the list of users is not individually identifiable. For example, the demographic information summarized by the demographic aggregator 225 is representative of one hundred users rather than one user. The example demographic aggregator 225 aggregates the demographic information into segments and/or market breaks such as, for example, 70% male age 20-29, 20% female age 20-29, 6% male age 30-39, 4% female age 30-39. However, any other approach to aggregating demographic information may additionally or alternatively be used.

In some examples, in addition to and/or as an alternative to providing aggregated demographic information, the social media server 105 provides a list of usernames to the central facility 110. In some examples, the AME 115 requests a username from users when they agree to become panelists (e.g., as part of a monitoring study). By providing the username to the AME 115, the AME 115 can validate demographic information provided by the demographic aggregator 225 against the demographic information provided by the user and/or may aggregate demographic information on its own.

In some examples, the AME 115 may want demographic information for a particular user of interest using an identifier associated with the user (e.g., a "handle," a screen name, a unique serial identifier, etc.). To protect the identity of the user, the example demographic aggregator 225 may obfuscate some of the demographic information for the user. For example, rather than providing the AME 115 demographic information indicating that a particular user is a female age 25 who lives in Chicago, the demographic information provided by the demographic aggregator 225 may instead indicate that the user is a female age 20-29 who lives in the Midwest. However, any other approach to provide demographic information for a user may additionally or alternatively be used.

The example messages identifier 230 of the illustrated example of FIG. 2 gathers social media messages that meet the criteria of a request received from the AME 115 via the example query responder 235. The example messages identifier 230 inspects the example social message database 220 to identify social media message(s) and a list of users associated with those identified social media messages that include keywords of interest.

In some examples, the example messages identifier 230 further limits results to social media messages including media such as an image(s), moving images and/or a video(s). In the illustrated example, the example messages identifier 230 operates SQL queries against the example social message database 220 to identify social media message(s) and a list of users associated with those identified social media messages. However, any other approach to accessing the data may additionally or alternatively be used.

The example query responder 235 of the illustrated example of FIG. 2 receives one or more queries from the AME 115 via the network 130. In the illustrated example, the one or more queries indicate asset keywords, user identifiers and/or message identifiers. The asset keywords are keywords that are associated with particular assets (e.g., a pair of running shoes) and result in social media messages that are relevant to the particular asset being identified. In examples disclosed herein, the asset keywords are selected by the AME 115 to closely correspond to assets of interest. For example, the asset keywords may include a name of the asset, a category associated with the asset, a trademark associated with the asset, a celebrity commissioned by the asset proprietor to post messages regarding the asset, etc. The user identifiers are identifiers for users that are associated with a message of interest such as, for example, social media messages that reference two or more assets (e.g., an asset-bundle regarding social media message). The message identifiers are identifiers for social media messages that are of interest (e.g., the example asset-bundle regarding social media messages). In examples disclosed herein, the user identifiers are provided by the AME 115 to request social media messages posted by the same user. Additionally or alternative, the message identifiers are provided by the central facility 110 to facilitate requests for additional social media messages posted by the same user associated with the corresponding message.

The example query responder 235 interacts with the example demographic aggregator 225 and the example messages identifier 230 to gather results to transmit to the AME 115 in response to the query received from the AME 115. As such, the example query responder 235 provides a unified interface from which the central facility 110 can request demographic information and social media messages. An example data table 500 representing example results returned to the AME 115 by the example query responder 235 is shown in the illustrated example of FIG. 5.

The example network 130 of the illustrated example of FIG. 2 is the Internet. However, the example network 130 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 130 enables the central facility 110 to be in communication with the social media server 105. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The example AME 115 of the illustrated example of FIG. 2 is an entity such as The Nielsen Company (US), LLC that monitors and/or reports exposure to assets and operates as a neutral third party. That is, the audience measurement entity does not produce, provide and/or sponsor assets to end users. This un-involvement with the asset proprietors (e.g., the companies and/or individuals that produce, provide and/or sponsor assets) ensures the neutral status of the audience measurement entity and, thus, enhances the trusted nature of the data it collects. The reports generated by the AME 115 may identify non-traditional asset-bundles for purchasing groups using social media and uses for the identified non-traditional asset-bundles.

The example AME 115 operates the central facility 110 to identify asset-bundles in social media and to classify the identified asset-bundles as, for example, traditional asset-bundles, non-traditional asset-bundles and/or coincidental pairings. The example central facility 110 of the illustrated example of FIG. 2 may include one or more servers operated by the AME 115. Although only one central facility 110 is shown in FIG. 2, many facilities may be provided for collecting the data. In some examples, these data collection facilities are structured in a tiered approach with many satellite collection facilities collecting data and forwarding the same to one or more central facilities 110.

The example asset profile database 240 of the illustrated example of FIG. 2 stores asset profile information such as an asset identifier, asset keywords, asset categories, etc. The asset profile information stored by the asset profile database 240 enables the example query generator 245 to generate a query to transmit to the social media server 105. An example data table 600 representing the example asset profile information is represented in the illustrated example of FIG. 6. The example asset profile database 240 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example asset profile database 240 may additionally or alternatively be implemented by one or more double data rate (DDR) memories, such as DDR, DDR2, DDR3, mobile DDR (mDDR), etc. The example asset profile database 240 may additionally or alternatively be implemented by one or more mass storage devices such as hard disk drive(s), compact disk drive(s), digital versatile disk drive(s), etc. While in the illustrated example the asset profile database 240 is illustrated as a single database, the asset profile database 240 may be implemented by any number and/or type(s) of databases.

The example query generator 245 of the illustrated example of FIG. 2 generates queries to be transmitted to the social media server 105. In the illustrated example, the query generator 245 reads asset profiles from the asset profile database 240 and generates a query (or queries) requesting some or all social media messages containing asset keywords (from the asset profile). In some examples, in addition to and/or as an alternative to generating a query based on asset keywords, the example query generator 245 generates queries requesting all social media messages posted within a particular time period of interest. For example, the AME 115 may want to identify non-traditional asset-bundles during the holiday season. In some such examples, the query generator 245 may generate a query (or queries) requesting all social media messages referencing running shoes and that were posted to the social media service in November and/or December. However, any other query criteria may additionally or alternatively be used for preparing queries.

In the illustrated example, the example query generator 245 also generates a query (or queries) requesting some or all social media messages associated with a user. For example, when an asset-bundle regarding social media message is identified, the query generator 245 may generate a query (or queries) using the user identifier and/or the message identifier associated with the identified asset-bundle regarding social media message to receive other messages posted by the user.

In examples disclosed herein, the example query generator 245 generates queries to be transmitted at periodic intervals (e.g., every 24 hours, every Monday, etc.). However, any other time period may additionally or alternatively be used for preparing queries. For example, the query generator 245 may generate queries at aperiodic intervals (e.g., when requested) and/or as a one-time event. Additionally or alternatively, instead of generating queries as they are to be transmitted, the example query generator 245 may generate queries ahead of time and cache the pre-generated queries.

The example query generator 245 of the illustrated example of FIG. 2 transmits the queries to the query responder 235. In the illustrated example, the queries are transmitted via the network 130 as the results of those queries are needed for analysis (e.g., at the end of a time period). For example, a query may request social media message(s) and/or demographic information associated therewith relevant to a particular asset and/or user. However, in some examples, the queries may be transmitted to the query responder 235 ahead of time, and results may be returned upon expiration of the time period. In the illustrated example, the queries and their associated results are transmitted via the network 130. However, the queries and their associated results may be transmitted in any other fashion. In response to the query, the example query generator 245 receives information associated therewith relevant to the particular social media messages of interest (e.g., a message identifier, the time when the message was posted, the content of the message, impression information, etc.) and/or demographic information associated with a user. An example data table 500 representing responses to queries is shown in the illustrated example of FIG. 5.

The example asset identifier 250 of the illustrated example of FIG. 2 inspects the social media messages returned by the query responder 235 for one or more assets mentioned in the social media messages. The example asset identifier 250 processes media included in the social media message and attempts to identify patterns and/or shapes (e.g., icons, logos, etc.) within the media. In the illustrated example, the asset identifier 250 utilizes image recognition to compare the identified patterns and/or shapes to known patterns and/or shapes to identify, for example, an asset referenced in the media of the social media message. For example, the asset identifier 250 may include and/or access a library (e.g., a data structure) storing known patterns and/or shapes indicative of a particular asset, a particular type of asset, a particular asset proprietor, etc.

In some examples, the media included with the social media message may include a stream of images (e.g., more than one frame of image data) in a burst. For example, the media may be a graphics interface format (GIF) image or a video. In some such examples, the asset identifier 250 may process some or all of the frames in the stream of images to identify a frame that satisfies a preferred quality (e.g., a minimum quality). In some examples, the asset identifier 250 may combine one or more of the frames in the stream of images to improve the quality of the media. In the illustrated example, the asset identifier 250 processes the frames in the stream of images prior to identifying an asset (if any) in the media. In some examples, the asset identifier 250 processes the frames in the stream of images while attempting to identify an asset.

Moreover, additional techniques, such as natural language processing may be used to identify an asset in the media. For example, the asset identifier 250 may parse the message of the social media message for asset keywords (from the asset profile database 240).

In the illustrated example, when the asset identifier 250 identifies two or more assets referenced by media included in a social media message, the social media message is an asset-bundle regarding social media message. The example asset identifier 250 stores information used for identifying asset-bundle regarding social media message, an asset and/or an asset-bundle in the asset-bundle regarding social media message in the asset-bundles database 255. For example, the asset identifier 250 may store identified asset-bundles and asset classifications associated with different asset-bundles in the example asset-bundles database 255. An example data table 700 representing example data that may be stored in the example asset-bundles database 255 is shown in the illustrated example of FIG. 7. The example asset-bundles database 255 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example asset-bundles database 255 may additionally or alternatively be implemented by one or more double data rate (DDR) memories, such as DDR, DDR2, DDR3, mobile DDR (mDDR), etc. The example asset-bundles database 255 may additionally or alternatively be implemented by one or more mass storage devices such as hard disk drive(s), compact disk drive(s), digital versatile disk drive(s), etc. While in the illustrated example the asset-bundles database 255 is illustrated as a single database, the asset-bundles database 255 may be implemented by any number and/or type(s) of databases.

The example profile generator 260 of the illustrated example of FIG. 2 generates a profile for a user associated with an asset-bundle regarding social media message. In the illustrated example, the profile generator 260 generates a socio-demographic profile for the user based on other social media messages posted by the user. In the illustrated example, the profile generator 260 reads a user identifier and/or a message identifier associated with an asset-bundle regarding social media message from the asset-bundles database 255 and prompts the query generator 245 to generate a query (or queries) requesting demographic information associated with the user. In some examples, the social media server 105 provides the demographic information associated with the user (e.g., from the demographic aggregator 225) and/or obfuscated demographic information for the user.

In some examples, in addition to and/or as an alternative to providing demographic information associated with the user, the messages identifier 230 returns all social media messages associated with the user. In the illustrated example, the profile generator 260 analyzes the returned social media messages to derive a profile for the social media user based on demographics associated with the identified assets. For example, the profile generator 260 may inspect pictures, products, location tags, captions, followers, tagged accounts, etc. for demographic clues indicative of the user. The example profile generator 260 of FIG. 2 generates a user profile using statistical methods such as Bayesian analysis on the demographic clues collected for the user. The profile generated by the example profile generator 260 includes demographic information (e.g., the user's age, gender, geographic location, income, ethnicity, etc.), interests and/or likes (e.g., the user likes puppies and working out at the gym), habits (e.g., the user eats a protein bar before going to the gym and purchases a smoothie from a particular smoothie vendor after the gym), etc.

In the illustrated example, the profile generator 260 stores the profile generated for a user in the user profiles database 265 along with message identifiers for the social media messages posted by the user. An example data table 800 representing example data that may be stored in the example user profiles database 265 is shown in the illustrated example of FIG. 8. The example user profiles database 265 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example user profiles database 265 may additionally or alternatively be implemented by one or more double data rate (DDR) memories, such as DDR, DDR2, DDR3, mobile DDR (mDDR), etc. The example user profiles database 265 may additionally or alternatively be implemented by one or more mass storage devices such as hard disk drive(s), compact disk drive(s), digital versatile disk drive(s), etc. While in the illustrated example the user profiles database 265 is illustrated as a single database, the user profiles database 265 may be implemented by any number and/or type(s) of databases.

The example bundle classifier 270 of the illustrated example of FIG. 2 classifies an asset-bundle of interest based on the number of times that the asset-bundle is referenced by users of interest. In the illustrated example, the asset-bundle of interest is specified by an entity that requests a report from the AME 115. The users of interest are determined by comparing the user profiles to constraints provided for inclusion in a purchasing group by, for example, the entity requesting the report. Users whose profiles satisfy the constraints of the purchasing group are determined to be part of the purchasing group. For example, the bundle classifier 270 filters the user profiles using the constraints of the purchasing group and the characteristic elements (e.g., demographic information, likes, interests, habits, etc.) associated with the profile. In the illustrated example, the purchasing group constraints are specified using gender and age information (e.g., female age 20-29, male age 30-39, etc.). However, any other approach to define a purchasing group may additionally or alternatively be used. For example, purchasing groups may be based on the seasons (e.g., members of a first purchasing group referenced an asset-bundle of interest during the fall, while members of a second purchasing group referenced the asset-bundle of interest during the Spring), geographic locations (e.g., users who live in California and referenced an asset-bundle of interest are in a different purchasing group than users who live in the Midwest and referenced the asset-bundle of interest), etc.

The example bundle classifier 270 of the illustrated example of FIG. 2 inspects the example user profiles database 265 to identify social media messages of interest posted by users whose profile satisfy the purchasing group constraints. The example bundle classifier 270 then inspects the example asset-bundles database 255 to identify which of the identified social media messages of interest also reference the asset-bundle. In the illustrated example of FIG. 2, the bundle classifier 270 classifies the asset-bundle by comparing the number of times the asset-bundle is referenced in the social media messages of interest (e.g., an asset-bundle count) to thresholds. For example, if the asset-bundle count is less than a coincidence threshold, then the pairing of the assets in the asset-bundle by users in the purchasing group was a coincidental pairing. Using a coincidence threshold is advantageous because it ensures a meaningful number of occurrences (e.g., a statistically significant sample size) are used when classifying the asset-bundle.

The example bundle classifier 270 of the illustrated example of FIG. 2 then compares the asset-bundle count for non-coincidental pairings to a second threshold (e.g., a traditional threshold). When an asset-bundle satisfies the traditional threshold, the bundle classifier 270 classifies the asset-bundle a traditional asset-bundle, and when the asset-bundle does not satisfy the traditional threshold, the bundle classifier 270 classifies the asset-bundle a non-traditional asset-bundle. In the illustrated example of FIG. 2, the traditional threshold is defined by the respective categories of the assets in the asset-bundle. For example, the bundle classifier 270 classifies an asset-bundle as a traditional asset-bundle when the assets are the same asset category and the bundle classifier 270 classifies an asset-bundle as a non-traditional asset-bundle when the assets are of different categories (e.g., cross-category). However, other approaches to differentiate between traditional asset-bundles and non-traditional asset-bundles may additionally or alternatively be used. For example, the traditional threshold may be a number such that when the asset-bundle count meets or exceeds the traditional threshold, the asset-bundle is classified a traditional asset-bundle and otherwise is classified a non-traditional asset-bundle.

The example coincidence threshold and the example traditional threshold may be determined by preferences specified by the AME 115 and/or an entity requesting a report. For example, an entity may specify that assets that are directed to the same subject matter are to be treated as within the same category, regardless of the respective asset category. For example, scuba diving lessons (e.g., a service) and swimming trunks (e.g., a product) are both related to water activities and, thus, may satisfy the same category traditional threshold. In other examples, the entity may specify that an asset-bundle in which both assets are related to the same subject matter (e.g., water activities) but are different asset categories (e.g., a service and a product) do not satisfy the traditional threshold and classified as a non-traditional asset-bundle. In some examples, the traditional threshold may adjust based on whether the assets are in the same category or are cross-category (e.g., jewelry and active wear). For example, the asset-bundle count for a cross-category asset-bundle to satisfy the traditional threshold may be relatively less than the asset-bundle count for a same category asset-bundle to satisfy the traditional threshold.

The example bundle classifier 270 of FIG. 2 stores the asset-bundle classifications in the asset-bundles database 255. The example bundle classifier 270 classifies and/or re-classifies the asset-bundles at periodic intervals (e.g., every 24 hours, every Monday, etc.). However, any other time period may additionally or alternatively be used for classifying and/or re-classifying the asset-bundles. For example, the bundle classifier 270 may classify and/or re-classify the asset-bundles at aperiodic intervals (e.g., when requested, each time the asset-bundles database 255 is updated (e.g., a new entry is added to the asset-bundles database 255 by the asset identifier 250), etc.) and/or as a one-time event.

The example reporter 275 of the illustrated example of FIG. 2 generates one or more reports classifying asset-bundles as coincidental pairings, non-traditional asset-bundles and/or traditional asset-bundles. In the illustrated example of FIG. 2, the example reporter 275 identifies the asset-bundle of interest and provides the purchasing group constraints to the bundle classifier 270 based on, for example, specifications provided by an entity requesting the report. In some examples, the reports are presented to the proprietors of the respective assets included in the asset-bundles and/or other entities.

In some examples, the reporter 275 may provide a variety of use cases based on the non-traditional asset-bundles. For example, the reporter 275 may process the asset-bundle classifications and identify a comparison set between brands. For example, users who purchase running shoes and running shorts may have a relatively higher likelihood of buying Acme brand running shoes and running shorts when the user also buys whole bean coffee, and have a relatively higher likelihood of buying SportsWear brand running shoes and running shorts when the user also buys ground coffee.

In some examples, the example reporter 275 may recommend advertisements and/or characteristics to include in advertisements and/or to present to a user (e.g., via a sponsored-media provider) based on the asset-bundle classifications in the example asset-bundles database 255. For example, the reporter 275 may identify a non-traditional asset-bundle for females age 13-20 that includes soda and puppies. The example reporter 275 may recommend to a soda provider that they include puppies in their soda advertisements if they are trying to improve purchases of their soda by females age 13-20.

In another illustrative example, the report generated by the example reporter 275 may be used to recommend an asset to a user. For example, a non-traditional asset-bundle may include eating yogurt, going to the gym and buying a smoothie. In some such examples, based on the non-traditional asset-bundle, it may be advantageous for an entity to identify users who eat yogurt and go to gym, and recommend that the user also try buying a smoothie.

In another illustrative example, an asset from a non-traditional asset-bundle may be recommended as a substitute for an asset in a traditional asset-bundle. For example, a traditional asset-bundle may indicate that users who bake a cake may also use oil and eggs, an identified non-traditional asset-bundle may indicate that users who bake a cake may use diet soda instead oil and eggs. In some such examples, diet soda may be provided as a substitute to a user who is baking a cake but needs substitute ingredients in lieu of oils and/or eggs.

In another illustrative example, non-traditional asset-bundles may be used to appeal to fan-bases and/or trending assets. For example, a non-traditional asset-bundle may indicate that users who eat macaroni and cheese may also add a special spicy sauce to the macaroni and cheese. In some such examples, a restaurant owner who provides macaroni and cheese on their menu may introduce an item on their menu that includes the special spicy sauce. In another illustrative example, a non-traditional asset-bundle may indicate that females age 20-29 who purchase hoop earrings also purchase Acme-brand purses. In such instances, when a determination is made that hoop earrings are trending, a purse vendor may introduce knock-off Acme-brand purses.

FIG. 3 is an example data table 300 that may be stored by the example social media server 105 of FIGS. 1 and/or 2 to store demographic information in association with a user. The example data table 300 includes a user identifier column 310, an age column 320, and a gender column 330. However, any other columns representing any other demographic information such as race, geographic location, income, etc. may additionally be used. Moreover, the example column(s) may be implemented in any other fashion. For example, the example age column 320 of the illustrated example identifies an age of the user. In some examples, the age column may store a birthdate of the user, such that an age of the user may be later calculated. The example user identifier column 310 of the illustrated example of FIG. 3 stores the username of the user of the social media service provided by the social media server 105. However, in some examples, the example user identifier column 310 may store an altered and/or obfuscated version of the username (e.g., a hashed version of the username). Using an altered and/or obfuscated version of the username ensures that if a list of usernames were to be provided to the central facility 110, that the users would not be personally identifiable.

The example data table 300 of the illustrated example includes three example rows 340, 350, 360. The example first row 340 indicates that "@USER-123" is a thirty-two year old female. The example second row 350 indicates that "@WATER-FAN" is a twenty-five year old male. The example third row 360 indicates that "@USER-ABC" is a forty year old male. While in the illustrated example of FIG. 3, three example rows 340, 350, 360 are shown corresponding to three example users, more or fewer users may be represented in the example data table 300 corresponding to the many users of the social media service provided by the social media server 105.

FIG. 4 is an example data table 400 that may be stored by the example social media server 105 of FIGS. 1 and/or 2 to store social media messages. The example data table 400 of the illustrated example of FIG. 4 includes a message identifier column 410, a message posting timestamp column 420, a message column 430, a media included column 440 and a posting user column 450. The example message identifier column 410 indicates an identifier of a message posted using the social media service provided by the social media server 105. In the illustrated example, the message identifier is a unique serial identifier. However, any other approach uniquely identifying a message may additionally or alternatively be used.

The example message posting timestamp column 420 indicates a date and/or time at which the message identified by the message identifier column 410 was posted on the social media service. The example message column 430 indicates the message that was posted to the social media service. The example media included column 440 indicates whether media (e.g., an image, a streaming image, a video, etc.) was posted on the social media service with the message identified by the message identifier column 410. The example media included column 440 is used by the social media server 105 when providing social media messages to the central facility 110. The example posting user column 450 identifies a username of the user that posted the social media message to the social media service provided by the social media server 105. The example posting user column 440 is used by the social media server 105 when providing social media messages to users.

The example data table 400 of the illustrated example of FIG. 4 includes three example rows 460, 470, 480 corresponding to three example social media messages. The example first row 460 indicates that a message having an identifier of "0001" and a text of "Just got my birthday gifts!" was posted by "@USER-123" at 8:15 PM on Jan. 20, 2015, and includes media. The example second row 470 indicates that a message having an identifier of "0002" and a text of "Another average episode of # scandal" was posted by "@USER-123" at 8:17 PM on Jan. 20, 2015, and does not include media. The example third row 480 indicates that a message having an identifier of "0003" and a text of "Can't wait to try these out when I go scuba diving next week" was posted by "@WATER-FAN" at 9:15 PM on Jan. 20, 2015, and includes media. While three example messages are represented in the example data table 400 of FIG. 4, more or fewer social media messages may be represented in the example data table 400 corresponding to the many messages posted to the social media service provided by the social media server 105.

FIG. 5 is an example data table 500 representing example social media message impression data and demographic information associated with the impression that may be supplied to the query generator 245 of the example central facility 110 of FIG. 2 by the social media server 105 of FIGS. 1 and/or 2. The example data table 500 of the illustrated example of FIG. 5 includes a message identifier column 510, a message column 515, a message posting timestamp column 520, an impression count column 525, an age between twenty and twenty-nine column 530, an age between thirty and thirty-nine column 535, an age between forty and forty-nine column 540, a male column 545, and a female column 550.

The example message identifier column 510 indicates a message identifier of the social media message. The message identifier is useful to the example central facility 110 if, for example, the example bundle classifier 270 has previously classified the asset-bundle for the identified message. Reusing previously identified classifications reduces the amount of processing requirements of the central facility 110.

The example message column 515 indicates the message that was posted to the social media service. Including the social media message enables the asset identifier 250 to identify one or more assets in the identified message using natural language processing techniques and/or if, for example, the identified message did not include media. The example message posting timestamp column 520 indicates a date and/or time at which the message identified by the message identifier column 510 was posted on the social media service. The example impression count column 525 identifies a number of impressions that occurred.

The example age between twenty and twenty-nine column 530, the example age between thirty and thirty-nine column 535, the example age between forty and forty-nine column 540, the example male column 545, and the example female column 550 identify respective percentages of the impressions that are attributable to the demographic segments identified by the respective column. While, in the illustrated example, age and gender demographics are shown, any other demographic factor may additionally or alternatively be used such as, for example, race, geographic location, income, etc. Moreover, in some examples, instead of identifying percentages, the example age between twenty and twenty-nine column 530, the example age between thirty and thirty-nine column 535, the example age between forty and forty-nine column 540, the example male column 545, and the example female column 550 identify a count of the number of impressions associated with the demographic segment identified by the respective column.

The example data table 500 includes three example rows corresponding to social media message information (e.g., demographic information and impression information) for three social media messages. An example first row 570 indicates that message ID "0001" was posted Jan. 20, 2015, at 8:15 PM and that the identified message received 22,000 impressions. Of those impressions identified in the first row 570, 18% were attributable to users between the age of twenty and twenty-nine, 20% were attributable to users between the ages of thirty and thirty-nine, 16% were attributable to users between the ages of forty and forty-nine, 40% were attributable to male users, and 60% were attributable to female users.

An example second row 580 indicates that message ID "0002" was posted Jan. 20, 2015, at 8:17 PM and that the identified message received 10,000 impressions. Of those impressions identified in the example second row 580, 18% were attributable to users between the age of twenty and twenty-nine, 30% were attributable to users between the ages of thirty and thirty-nine, 13% were attributable to users between the ages of forty and forty-nine, 30% were attributable to male users, and 70% were attributable to female users.

An example third row 590 indicates that message ID "0003" was posted Jan. 20, 2015, at 9:15 PM and that the identified message received 18,000 impressions. Of those impressions identified in the third example row 590, 65% were attributable to users between the age of twenty and twenty-nine, 22% were attributable to users between the ages of thirty and thirty-nine, 18% were attributable to users between the ages of forty and forty-nine, 65% were attributable to male users, and 45% were attributable to female users. While social media message information for three example messages are represented in the example data table 500 of FIG. 5, social media message information for more or fewer social media messages may be represented in the example data table 500 corresponding to the many messages posted to the social media service provided by the social media server 105.

FIG. 6 represents an example data table 600 that may be stored by the AME 115 of FIGS. 1 and/or 2 representing asset keywords and asset categories associated with different assets. The example data table 600 of the illustrated example of FIG. 65 is stored in the example asset profile database 240. The example data table 600 of the illustrated example of FIG. 6 includes an asset identifier 610, an asset keyword(s) column 620 and an asset category column 630. The asset identifier column 610 identifies assets (e.g., media, media events, products and/or services). In the illustrated example, products and services are identified. However, any other type of assets may additionally or alternatively be used. The example asset keywords of the example asset keyword(s) column 620 are used when querying the social media server 105 to retrieve social media messages that are asset-regarding social media messages that are associated with particular assets (e.g., the assets identified by the asset identifier column 610). In the illustrated example, the asset keywords are represented using a text string, with various keywords and/or phrases separated by semicolons. However, any other approach to storing the asset keywords may additionally or alternatively be used. The example asset categories of the example asset category column 630 are used when classifying asset-bundles in the asset-bundles database 255 based on the particular assets (e.g., the assets identified by the asset identifier column 610). In the illustrated example, the asset categories are represented using a text string. However, any other approach to storing the asset categories may additionally or alternatively be used. In addition, while the identified assets are associated with one asset category, in other examples, an identified asset may be associated two or more asset categories.

The example data table 600 of the illustrated example of FIG. 6 includes five example rows 640, 650, 660, 670, 680. The example first row 640 identifies that the asset "RUNNING SHOES" is "FOOTWEAR" and is identifiable using the asset keywords "RUNNING; SHOES; SPEED; AGILITY." The example second row 650 identifies that the asset "SCUBA DIVING" is a "SERVICE" and is identifiable using the asset keywords "SCUBA; DIVING; WATER; UNDERWATER; OXYGEN." The example third row 660 identifies that the asset "FLIP-FLOPS" is "FOOTWEAR" and is identifiable using the asset keywords "FLIP-FLOPS; CASUAL; SANDALS; BEACH." The example fourth row 670 identifies that the asset "COUCH" is "FURNITURE" and is identifiable using the asset keywords "COUCH; COMFORTABLE; CHAIR; RECLINE." The example fifth row 680 identifies that the asset "EARRINGS" is "JEWELRY" and is identifiable using the asset keywords "EARS; HOOPS; JEWELRY; CELEBRATIONS."

FIG. 7 represents an example data table 700 that may be stored by the AME 115 of FIGS. 1 and/or 2 representing identified asset-bundles and asset classifications associated with different asset-bundles. The example data table 700 of the illustrated example of FIG. 7 is stored in the example asset-bundles database 255. The example data table 700 of the illustrated example of FIG. 7 includes a message identifier column 710, a posting user column 720, a first asset column 730, a second asset column 740 and an asset-bundle classification column 750.

The example message identifier column 710 indicates an identifier of an asset-bundle regarding social media message posted using the social media service provided by the social media server 105. In the illustrated example, the message identifier is a unique serial identifier. However, any other approach uniquely identifying a message may additionally or alternatively be used. The example posting user column 720 identifies a username of the user that posted the identified social media message to the social media service provided by the social media server 105. The example first asset column 730 and the example second asset column 740 identify particular assets identified in the asset-bundle regarding social media message. The example asset-bundle classification column 750 identifies whether the identified asset-bundle is a traditional asset-bundle, a non-traditional asset-bundle and/or a coincidental pairing.

The example data table 700 of the illustrated example of FIG. 7 includes six example rows 765, 770, 775, 780, 785, 790. The example first row 765 indicates that message ID "0001" was posted by "@USER-123." In addition, the identified message "0001" references "earrings" and "running shoes," the pairing of which in the identified message is non-traditional for a female age 30-39.

The example second, third and fourth rows 770, 775, 780 indicate that message ID "0003" was posted by "@WATER-FAN,", and that the identified message references "flip-flops," "scuba diving" and a "couch." In addition, the example second row 770 indicates that the pairing of "flip-flops" and "scuba diving" is a traditional asset-bundle. The example third row 775 indicates that the pairing of "flip-flops" and a "couch" is a coincidence. The example fourth row 780 indicates that the pairing of "scuba diving" and a "couch" is a coincidence.

The example fifth row 785 indicates that message ID "0004" was posted by "@USER-ABC." In addition, the identified message "0004" references "flip-flops" and "scuba diving," the pairing of which in the identified message is traditional. The example sixth row 790 indicates that message ID "0005" was posted by "@USER-ABC." In addition, the identified message "0005" references "earrings" and "running shoes," the pairing of which in the identified message is a coincidence.

FIG. 8 represents an example data table 800 that may be stored by the AME 115 of FIGS. 1 and/or 2 representing profiles generated for users associated with asset-bundle regarding social media messages. The example data table 800 of the illustrated example of FIG. 8 is stored in the example user profiles database 265. The example data table 800 of the illustrated example of FIG. 8 includes a posting user column 810, a posting user profile column 820 and a posted message(s) identifier column 830.

The example posting user column 810 identifies a username of the user that posted an asset-regarding social media message to the social media service provided by the social media server 105. The example posting user profile column 820 identifies socio-demographic information associated with the identified user that posted the asset-bundle regarding social media message to the social media service provided by the social media server 105. Including the socio-demographic information enables the bundle classifier 270 to identify social media messages posted by users who have the same and/or similar profiles that satisfy constraints for a purchasing group (e.g., cohorts of the user). In the illustrated example, the socio-demographic information is user gender and user age information. However, any other socio-demographic information associated with the user may additionally or alternatively be used. The example posted message(s) identifier column 830 indicates an identifier asset-bundle regarding social media message(s) posted by the user. In the illustrated example, the message identifier(s) is/are a unique serial identifier. However, any other approach uniquely identifying a message may additionally or alternatively be used.

The example data table 800 of the illustrated example of FIG. 8 includes two example rows 840, 850. The example first row 840 indicates that "@USER-123" is a female age 30-39 and that she posted the message IDs "0001" and "0002." The example second row 850 indicates that "@WATER-FAN" is a male age 20-29 and that he posted the message ID "0003."

While an example manner of implementing the example social media server 105 of FIG. 1 is illustrated in FIG. 2, and an example manner of implementing the example central facility 110 of FIG. 1 is illustrated in FIG. 2, one or more of the elements, processes and/or devices illustrated in FIG. 2 may be combined, divided, re-arranged, omitted, eliminated and/or implemented in any other way. Further, the example social media registrar 205, the example user demographic database 210, the example social message interface 215, the example social message database 220, the example demographic aggregator 225, the example messages identifier 230, the example query responder 235 and/or, more generally, the example social media server 105 of FIG. 2, and/or the example asset profile database 240, the example query generator 245, the example asset identifier 250, the example asset-bundles database 255, the example profile generator 260, the example user profiles database 265, the example bundle classifier 270, the example reporter 275 and/or, more generally, the example central facility 110 of FIG. 2 may be implemented by hardware, software, firmware and/or any combination of hardware, software and/or firmware. Thus, for example, any of the example social media registrar 205, the example user demographic database 210, the example social message interface 215, the example social message database 220, the example demographic aggregator 225, the example messages identifier 230, the example query responder 235 and/or, more generally, the example social media server 105 of FIG. 2, and/or the example asset profile database 240, the example query generator 245, the example asset identifier 250, the example asset-bundles database 255, the example profile generator 260, the example user profiles database 265, the example bundle classifier 270, the example reporter 275 and/or, more generally, the example central facility 110 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example social media registrar 205, the example user demographic database 210, the example social message interface 215, the example social message database 220, the example demographic aggregator 225, the example messages identifier 230, the example query responder 235 and/or, more generally, the example social media server 105 of FIG. 2, and/or the example asset profile database 240, the example query generator 245, the example asset identifier 250, the example asset-bundles database 255, the example profile generator 260, the example user profiles database 265, the example bundle classifier 270, the example reporter 275 and/or, more generally, the example central facility 110 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example social media server 105 of FIG. 1 and/or the example central facility 110 of FIG. 1 may include one or more elements, processes and/or devices in addition to, or instead of, those illustrated in FIG. 2, and/or may include more than one of any or all of the illustrated elements, processes and devices.

Figure 9:
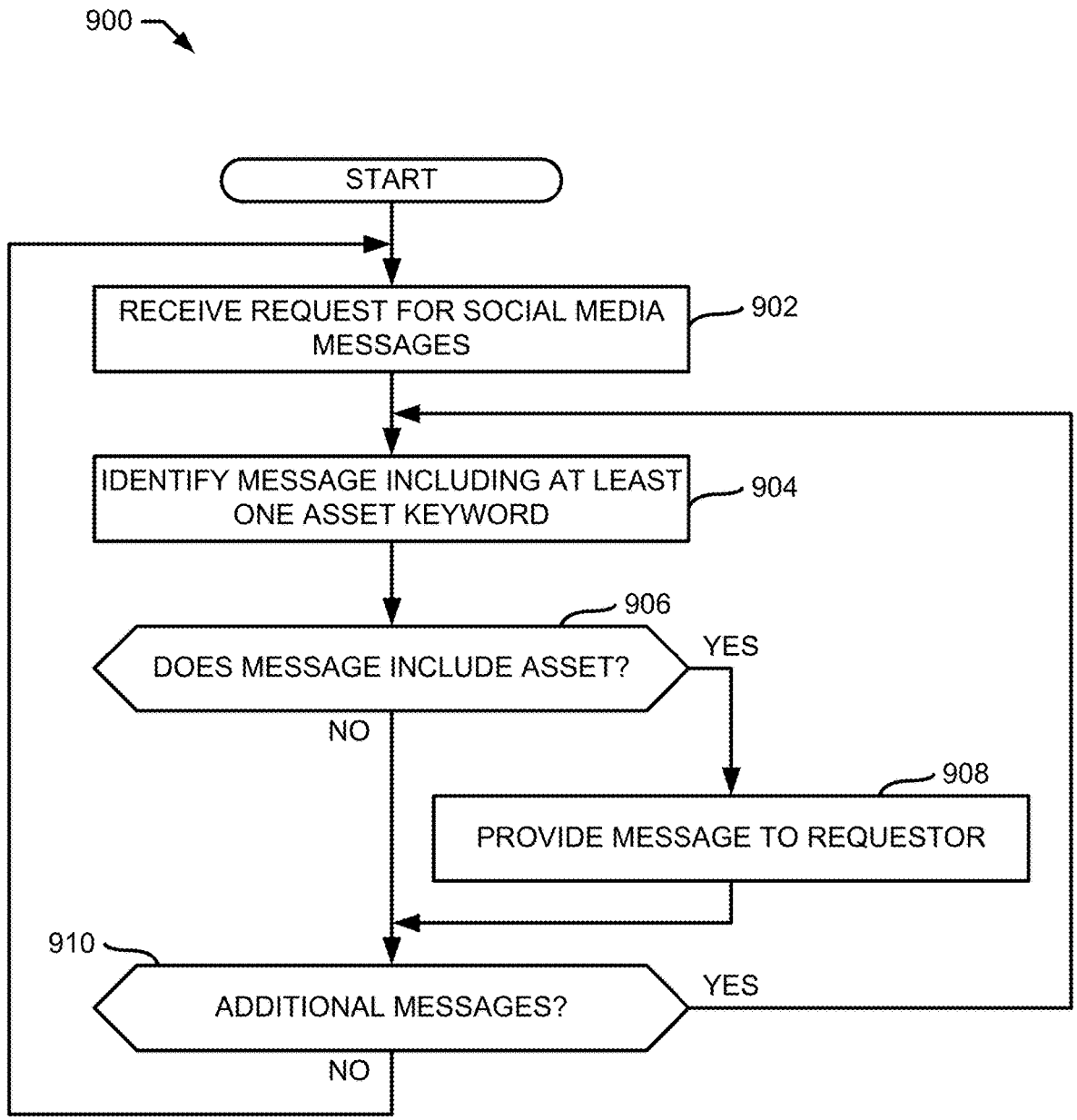
FIG. 9 is a flowchart representative of example machine-readable instructions that may be executed by the example social media server of FIGS. 1 and/or 2 to reply to a request for social media messages associated with an asset of interest.
Figure 11:
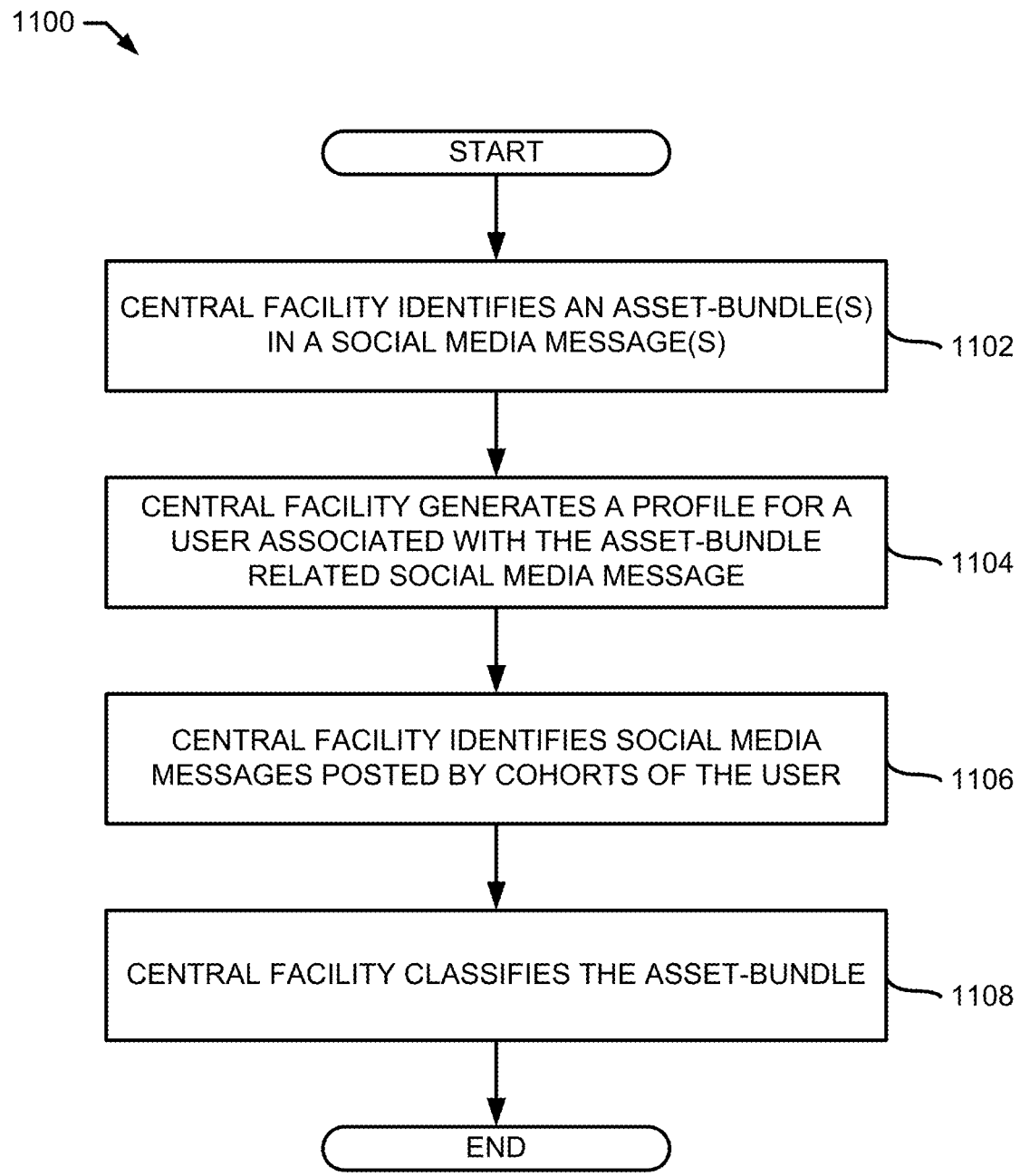
FIG. 11 is a flowchart representative of example machine-readable instructions that may be executed by the example central facility of FIGS. 1 and/or 2 to identify non-traditional asset-bundles for purchasing groups using social media.
Figure 12:
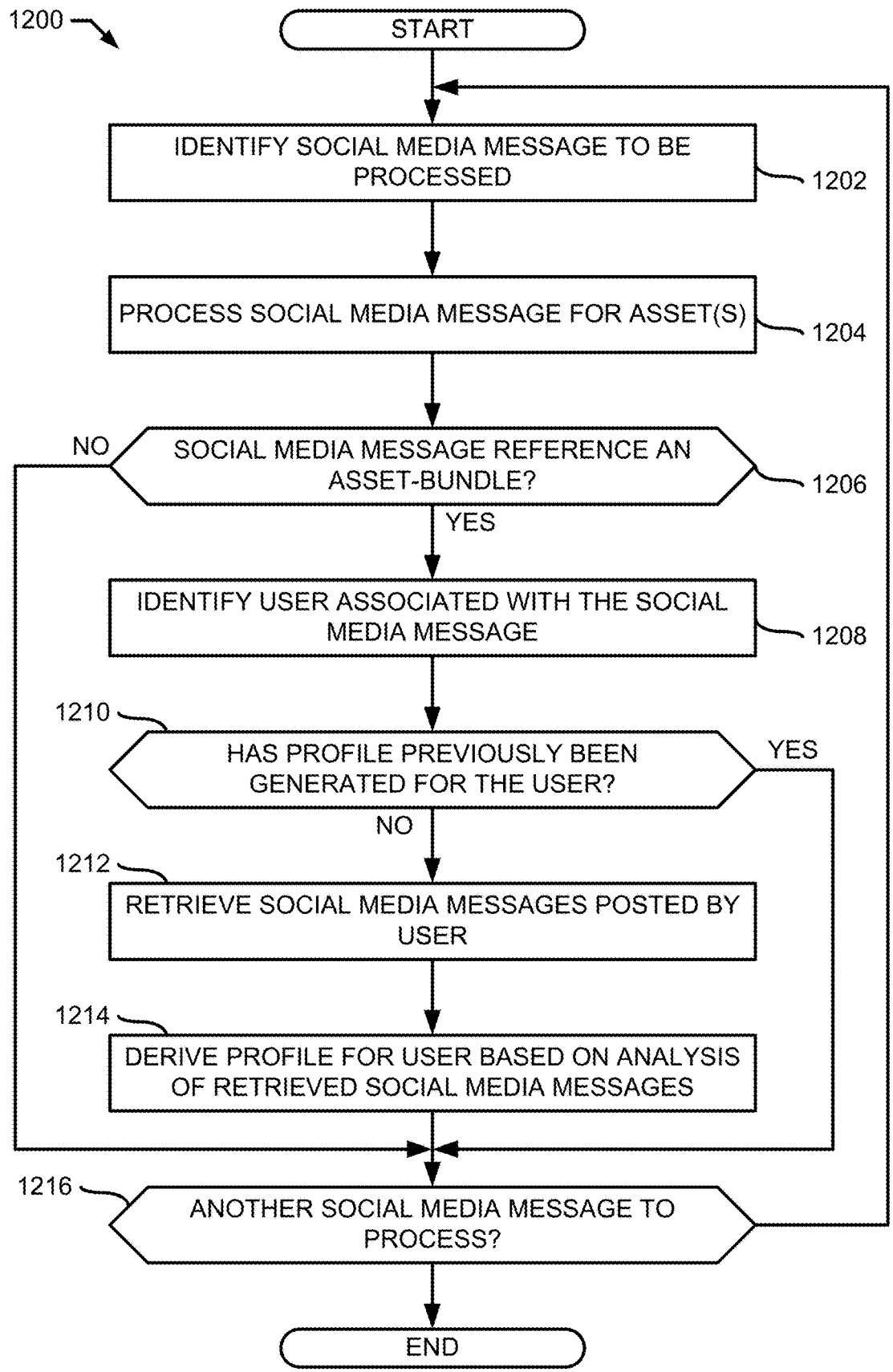
FIG. 12 is a flowchart representative of example machine-readable instructions that may be executed by the example central facility of FIGS. 1 and/or 2 to generate a profile for a user associated with an asset-bundle regarding social media message.
Figure 13:
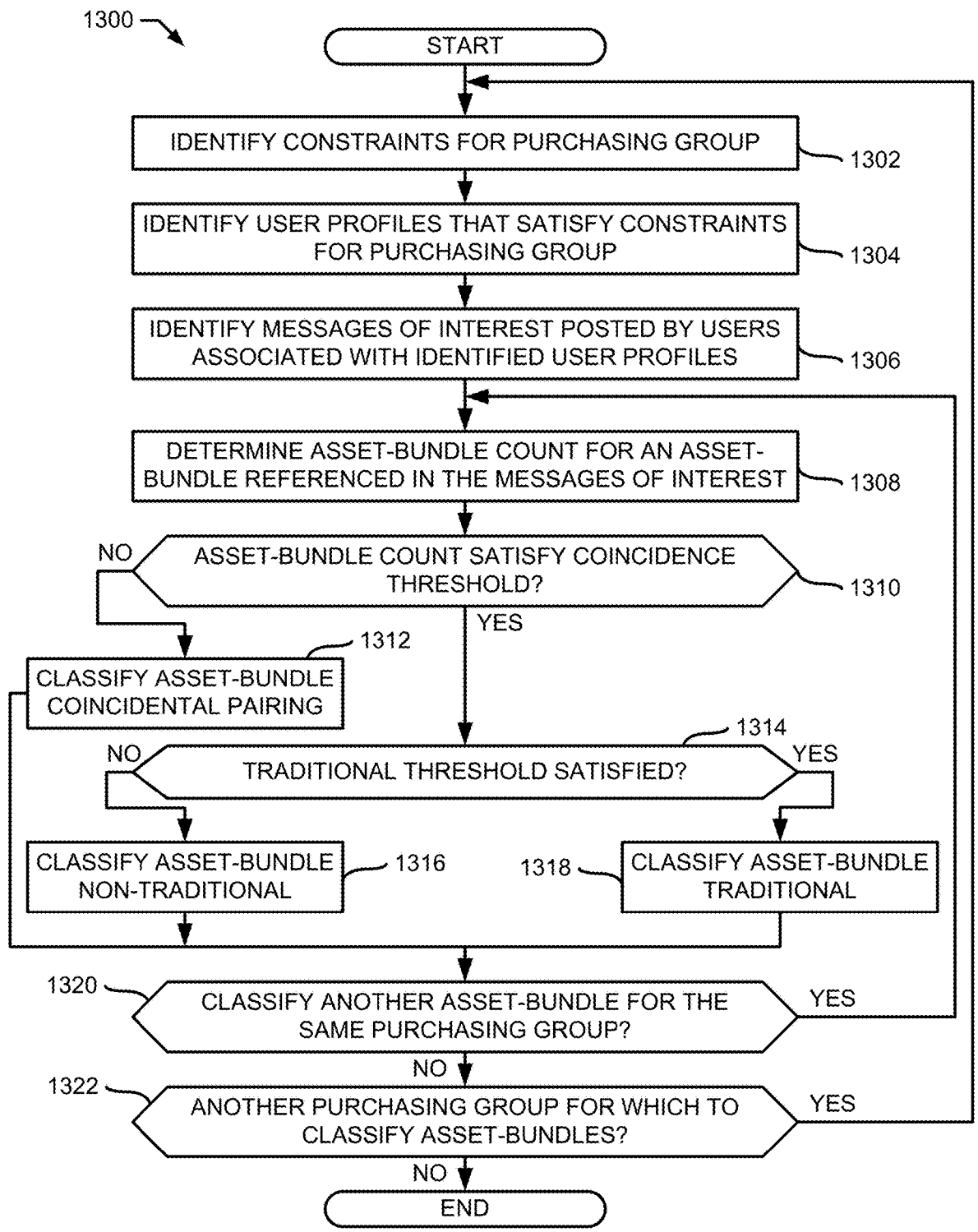
FIG. 13 is a flowchart representative of example machine-readable instructions that may be executed by the example central facility of FIGS. 1 and/or 2 to classify identified asset-bundles for purchasing groups.

Flowcharts representative of example machine-readable instructions for implementing the example social media server 105 of FIGS. 1 and/or 2 are shown in FIGS. 9 and/or 10. Flowcharts representative of example machine-readable instructions for implementing the example central facility 110 of FIGS. 1 and/or 2 are shown in FIGS. 11-13. In these example(s), the machine-readable instructions comprise a program(s) for execution by a processor such as the processor 1412 shown in the example processor platform server 1400 discussed below in connection with FIG. 14 and/or the example processor 1512 shown in the example processor 1500 discussed below in connection with FIG. 15. The program(s) may be embodied in software stored on a tangible computer readable storage medium such as a CD-ROM, a floppy disk, a hard drive, a digital versatile disk (DVD), a Blu-ray disk, or a memory associated with the processor 1412, 1512, but the entire program and/or parts thereof could alternatively be executed by a device other than the processor 1412, 1512 and/or embodied in firmware or dedicated hardware. Further, although the example program(s) is/are described with reference to the flowcharts illustrated in FIGS. 9, 10 and/or 11-13, many other methods of implementing the example social media server 105 and/or the example central facility 110 may alternatively be used. For example, the order of execution of the blocks may be changed, and/or some of the blocks described may be changed, eliminated, or combined.

As mentioned above, the example processes of FIGS. 9, 10 and/or 11-13 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine-readable storage medium" are used interchangeably. Additionally or alternatively, the example processes of FIGS. 9, 10 and/or 11-13 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 is a flowchart representative of example machine-readable instructions 900 that may be executed by the example social media server 105 of FIGS. 1 and 2 to reply to a request for social media messages of interest. The example instructions 900 of the illustrated example of FIG. 9 begin at block 902 when the example query responder 235 of the example social media server 105 of FIG. 2 receives a request for social media message information from the query generator 245 of the example central facility 110 of FIG. 2. In the illustrated example, the example query includes a request that all social media messages, where the social media message contains asset keywords, be presented to the query generator 245. However, any other approach to querying the social media server 105 may additionally or alternatively be used.

In the illustrated example, the query is received via the network 130. However, the query may be received in any other fashion. Moreover, the example query of the illustrated example is received as the results are being requested. That is, the example query generator 245 expects an immediate response to the query. However, the query may be received ahead of time, and the example query responder 235 may await an appropriate time to respond to the query.

At block 904, the example messages identifier 230 of FIG. 2 identifies a message of interest. In the illustrated example, the example messages identifier 230 inspects the example social message database 220 to determine whether the message is responsive to the query. For example, the messages identifier 230 identifies whether a social media messages includes at least one asset keyword. In the illustrated example, the asset keywords are text strings that are associated with particular assets of interest. An example data table 600 including example asset keywords is shown in the illustrated example of FIG. 6. In the illustrated example, the messages identifier 230 uses regular expressions to determine whether the social media message includes the asset keywords. However, any other approach to identifying whether keywords are present in a social media message may additionally or alternatively be used.

At block 906, the example messages identifier 230 then identifies whether the identified message includes media. In the illustrated example, the messages identifier 230 inspects the example social message database 220 to determine whether the message is responsive to the query. For example, the messages identifier 230 identifies whether the message includes an image(s), moving images and/or a video(s).

If, at block 906, the messages identifier 230 determines that media is not present in the social media message, then, at block 910, the messages identifier 230 determines whether additional messages having at least one asset keyword exists. If, at block 910, such messages exist, then, at block 904, the messages identifier 230 identifies those messages and, at block 906, the messages identifier 230 determines whether those messages include media.

If, at block 906, the identified social media message includes media, then, at block 908, the example query responder 235 provides the social media message to the query generator 245. After the example query responder 235 provides the social media message at block 908 or if the messages identifier 230 determines that media is not present in the social media message at block 906, then, at block 910, the example messages identifier 230 determines whether additional messages having at least one asset keyword exist. If, at block 910, the example messages identifier 230 determines additional social media messages having at least one asset keyword do not exist, control returns to block 902 and the example query responder 235 awaits further requests for social media messages.

While in the illustrated example, the example instructions 900 of FIG. 9 represent a single iteration of providing requested social media messages of interest, in practice, the example instructions 900 of the illustrated example of FIG. 9 may be executed in parallel (e.g., in separate threads) to allow the social media server 105 to handle multiple requests for social media messages of interests at a time.

Figure 10:
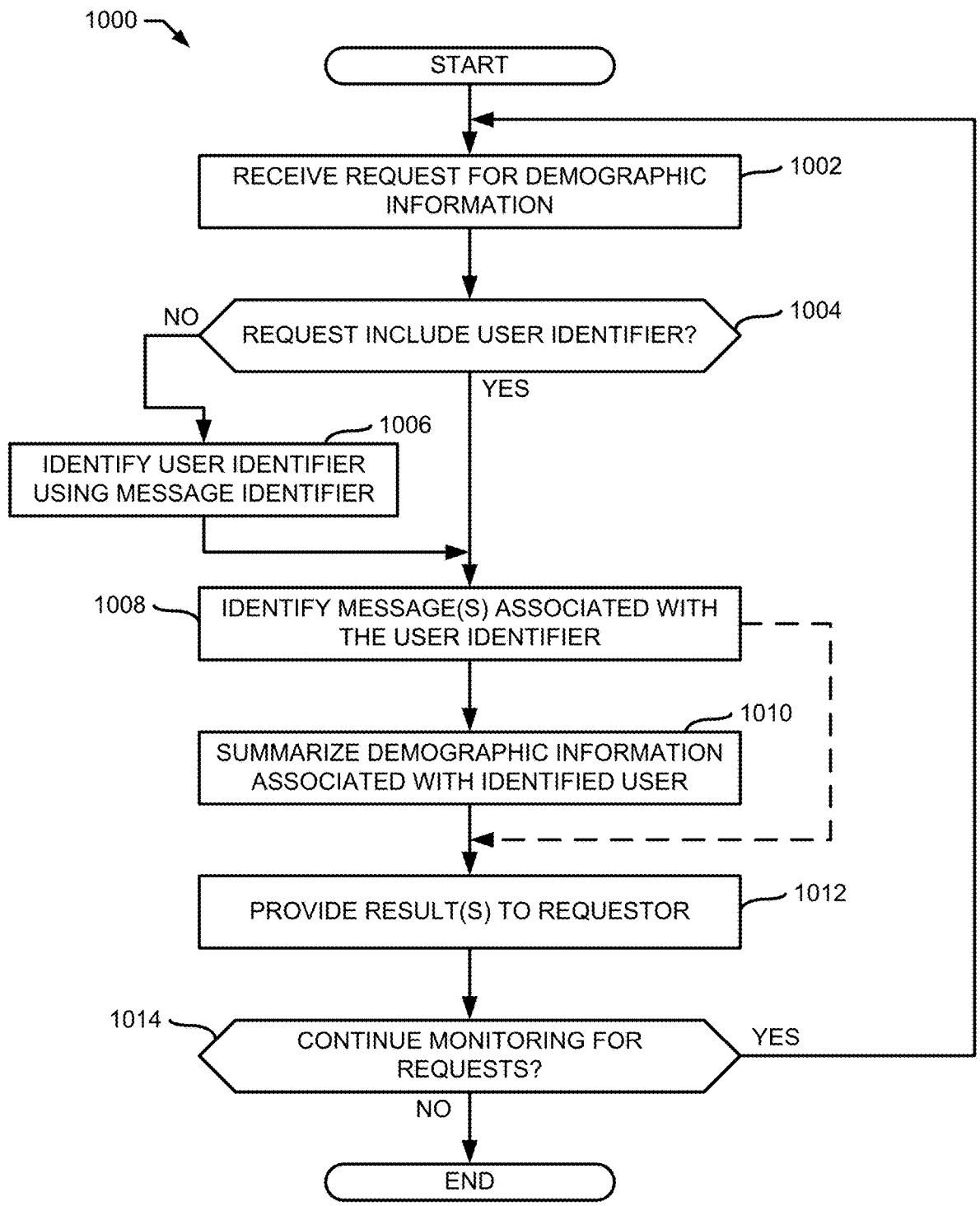
FIG. 10 is a flowchart representative of example machine-readable instructions that may be executed by the example social media server of FIGS. 1 and/or 2 to reply to a request for demographic information associated with a user of interest.

FIG. 10 is a flowchart representative of example machine-readable instructions 1000 that may be executed by the example social media server 105 of FIGS. 1 and 2 to reply to a request for demographic information associated with users of interest. The example instructions 1000 of the illustrated example of FIG. 10 begin at block 1002 when the example query responder 235 of the example social media server 105 of FIG. 2 receives a request for demographic information associated a user of interest from the query generator 245 of the example central facility 110 of FIG. 2. In the illustrated example, the query is received via the network 130. However, the query may be received in any other fashion. Moreover, the example query of the illustrated example is received as the results are being requested. That is, the example query generator 245 expects an immediate response to the query. However, the query may be received ahead of time, and the example query responder 235 may await an appropriate time to respond to the query.

At block 1004, the example messages identifier 230 of FIG. 2 determines whether the request includes a user identifier associated with the user. If, at block 1004, the messages identifier 230 determines that the request does not include a user identifier, then, at block 1006, the messages identifier 230 identifies a user identifier using a message identifier included in the request. For example, the messages identifier 230 may inspect the social message database 220 using the message identifier to identify the user identifier associated with the message identifier. An example data table 400 including social media messages posted by users of the social media service provided by the social media server 105 is shown in the illustrated example of FIG. 4.

After the messages identifier 230 identifies the user identifier at block 1006 or if, at block 1004, the messages identifier 230 determines that the request includes a user identifier, then, at block 1008, the messages identifier 230 identifies the message(s) associated with the user identifier. In the illustrated example, the messages identifier 230 inspects the example social message database 220 for the messages. In some examples, the request received at the example block 1002 may include a timing restriction. For example, the request may request social media messages that were posted by the user between a first time and a second time, after a third time, before a fourth time, etc. In the illustrated example, timestamps of posting times stored in the social message database 220 are compared to the timing restriction to determine whether the posting is responsive to the query.

At block 1010, the example demographic aggregator 225 uses the user identifier to retrieve demographics associated with the user identifier from the user demographic database 210. The retrieved demographic information is summarized by the example demographic aggregator 225. In the illustrated example, the demographic aggregator 225 summarizes the demographic information by identifying that the user exhibits a range of a particular demographic factor. For example, the demographics aggregator 225 identifies that the user is a male age 30-39. In some examples, after the messages identifier 230 identifies the messages associated the user identifier at block 1008, control proceeds to block 1012 and the example query responder 235 provides the identified messages to the query generator 245.

At block 1014, the examples query responder 235 provides the identified social media messages and demographic information associated with the user of interest to the query generator 245. At block 1014, the query responder 235 determines whether to continue monitoring for requests for demographic information. If, at block 1014, the example query responder 235 determines to continue monitoring for requests, then control returns to block 1002 and the query responder 235 awaits further requests for demographic information associated with a user. Otherwise, the example process 1000 of FIG. 10 ends.

FIG. 11 is a flowchart representative of example machine-readable instructions 1100 that may be executed by the example central facility 110 of FIGS. 1 and 2 to identify non-traditional asset-bundles using social media. The example process 1100 of the illustrated example of FIG. 11 begins at block 1102 when the example central facility identifies an asset-bundle in a social media message. For example, central facility 110 may parse a social media message that references an asset of interest. In some such examples, the central facility 110 may utilize image recognition to identify a second asset in the social media message. Example asset-bundles identified by the central facility 110 may be stored in manner described in connection with the example data table 700 of FIG. 7. In some examples, the central facility 110 requests from the social media server 105 social media messages related to an asset of interest. For example, the central facility 110 may consult the example data table 600 of the illustrated example of FIG. 6 to identify asset keywords that are used to associate social media messages with particular assets. Example responses to the request may be formatted in a manner described in connection with the example data table 500 of FIG. 5.

At block 1104, the example central facility 110 generates a profile for a user associated with the identified social media message. For example, the central facility 110 may analyze additional social media messages associated with the user for characteristic elements. Using statistical methods on the characteristic elements, such as applying Bayesian analysis, the central facility 110 may generate the profile for the user. Example generated user profiles may be formatted in a manner described in connection with the example data table 800 of FIG. 8. An example approach to generating user profiles is described below in connection with FIG. 12.

At block 1106, the example central facility 110 identifies social media messages posted by cohorts of the user. For example, the central facility 110 may identify user profiles that share a characteristic element included in the user profile and request additional social media messages from the social media server 105 that were posted by users associated with the identified user profiles. In some examples, the central facility 110 may identify social media messages of interest by identifying user profiles that satisfy constraints for a purchasing group.

At block 1108, the example central facility 110 classifies the asset-bundle based on occurrences of the asset-bundle in the social media messages associated with the cohorts. For example, the central facility 110 may classify the asset-bundle a coincidental pairing, a non-traditional pairing and/or a traditional pairing based on a comparison of the count to a coincidence threshold and a traditional threshold. An example approach to classifying the identified asset-bundles is described below in connection with FIG. 13.

FIG. 12 is a flowchart representative of example machine-readable instructions 1200 that may be executed by the example central facility 110 of FIGS. 1 and 2 to generate a profile for a user associated with an asset-bundle regarding social media message. The example process 1200 of the illustrated example of FIG. 12 begins at block 1202 when the example asset identifier 250 of the central facility 110 identifies a social media message to be processed. For example, the asset identifier 250 may receive the social media message from the example query responder 235 of the example social media server 105 of FIG. 2. At block 1204, the example asset identifier 250 processes the social media message for asset(s). In the illustrated example, the asset identifier 250 uses image recognition to identify one or more assets in media included with the social media message. For example, the asset identifier 250 may compare patterns and/or shapes identified in the media (e.g., an image, moving images and/or a video) to patterns and/or shapes associated with particular assets. However, the social media message may be processed for asset(s) in any other fashion such as, for example, using natural language processing techniques. In the illustrated example, the asset identifier 250 logs identified asset(s) in the example asset-bundles database 255 of the example central facility 110 of FIG. 2, along with a message identifier for the social media message and the posting user.

At block 1206, the example asset identifier 250 determines whether the social media message is an asset-bundle regarding social media message. If, at block 1206, the example asset identifier 250 does not identify two or more assets in the social media message, then the social media message is not an asset-bundle regarding social media message and control proceeds to block 1216 to determine whether another social media message to process exists.

If, at block 1206, the example asset identifier 250 determines that the social media message is an asset-bundle regarding social media message (e.g., the asset identifier 250 identified two or more assets in the social media message), then, at block 1208, the example profile generator 260 of the example central facility 110 of FIG. 2 identifies a user associated with the asset-bundle social media message. For example, the profile generator 260 may use the user identifier associated with the asset-bundle social media message. At block 1210, the example profile generator 260 determines whether a profile for the user has previously been generated. For example, the profile generator 260 may inspect user profiles stored in the example user profiles database 265 of the central facility 110 of FIG. 2 for a profile generated for the user. Determining whether a profile has previously been generated for the user reduces the amount of processing requirements of the central facility 110. If, at block 1210, the example profile generator 260 determines that a profile has previously been generated for the user, then control proceeds to block 1216 to determine whether another social media message to process exists.

If, at block 1210, the example profile generator 260 determines that a profile has not previously been generated for the user, then, at block 1212, the profile generator 260 retrieves social media messages posted by the user. For example, the profile generator 260 may request the social media server 105 provide all social media messages posted by the user. At block 1214, the example profile generator 260 derives a profile for the user based on analysis of the retrieved social media messages. For example, the profile generator 260 may generate a profile using demographic clues identified in pictures, products, location tags, captions, followers, tagged accounts, etc. In the illustrated example, the profile is a socio-demographic profile and may include demographic information about the user (e.g., age, gender, geographic location, income, ethnicity, etc.), interests and/or likes of the user (e.g., the user likes puppies and working-out at the gym), habits (e.g., the user eats a protein bar before going to the gym and purchases a smoothie from a particular smoothie vendor after the gym), etc. In the illustrated example, the profile generator 260 stores the generated profile in the example user profiles database 265.

If, at block 1206, the example asset identifier 250 determines that the social media message is not an asset-bundle regarding social media message, or, if, at block 1210, the example profile generator 260 determines that a profile has previously been generated for the user, or after the profile generator 260 derives the profile at block 1214, then, at block 1216, the example asset identifier 250 determines whether another social media message to process exists. If, at block 1216, the example assets identifier 250 determines another social media message to process exists, then control returns to block 1202 and the asset identifier 250 awaits further social media messages to identify processing. Otherwise, the example process 1200 of FIG. 12 ends.

FIG. 13 is a flowchart representative of example machine-readable instructions 1300 that may be executed by the example central facility 110 of FIGS. 1 and 2 to classify identified asset-bundles for purchasing groups. The example process 1300 of the illustrated example of FIG. 13 begins at block 1302 when the example bundle classifier 270 of the example central facility 110 of FIG. 2 identifies constraints for a purchasing group. In the illustrated example, the bundle classifier 270 receives specifications for the purchasing group from the example reporter 275 of the example central facility 110 of FIG. 2. At block 1304, the example bundle classifier 270 identifies user profiles that satisfy the constraints for the purchasing group. In the illustrated example, the bundle classifier 270 inspects the user profiles database 265 of the example central facility 110 of FIG. 2 for profiles that satisfy the constraints specified for the purchasing group. At block 1306, the example bundle classifier 270 identifies messages of interest posted by users associated with the identified user profiles. For example, the example bundle classifier 270 may use the message identifiers associated with the users associated with the identified user profiles and identify the social media messages in the example asset-bundles database 255 of the example central facility 110 of FIG. 2.

At block 1308, the example bundle classifier 270 determines an asset-bundle count for an asset-bundle referenced in the messages of interest. For example, the bundle classifier 270 may count the number of times an asset-bundle is referenced in the messages of interest. At block 1310, the example bundle classifier 270 determines whether the asset-bundle count satisfies a coincidence threshold. If, at block 1310, the example bundle classifier 270 determines that the asset-bundle count does not satisfy the coincidence threshold, then, at block 1312, the example bundle classifier 270 classifies the asset-bundle as a coincidental pairing. Using a coincidence threshold (e.g., a minimum asset-bundle count) ensures a meaningful number of occurrences (e.g., a statistically significant sample size) are used when classifying the asset-bundle. Control then proceeds to block 1320 to determine whether another asset-bundle to classify for the same purchasing group exists.

If, at block 1310, the example bundle classifier 270 determines that the asset-bundle count satisfies the coincidence threshold (e.g., meets and/or exceeds a minimum asset-bundle count), then, at block 1314, the example bundle classifier 270 determines whether to classify the asset-bundle a traditional asset-bundle or a non-traditional asset-bundle based on if the traditional threshold is satisfied. In the illustrated example, the bundle classifier 270 determines that an asset-bundle satisfies the traditional threshold when the assets of the asset-bundle are in the same category, and that an asset-bundle does not satisfy the traditional threshold when the assets of the asset-bundle are cross-category. However, other approaches for distinguishing between traditional asset-bundles and non-traditional asset-bundles may additionally or alternatively be used. For example, the traditional threshold may be a number. In some such examples, if the asset-bundle count meets or exceeds the traditional threshold, then the asset-bundle is a traditional asset-bundle. Otherwise, if the asset-bundle count does not satisfy the traditional threshold, the asset-bundle is a non-traditional asset-bundle.

If, at block 1314, the example bundle classifier 270 determines that the traditional threshold is not satisfied, then, at block 1316, the bundle classifier 270 classifies the asset-bundle as non-traditional. If, at block 1314, the example bundle classifier 270 determines that the traditional threshold is satisfied, then, at block 1318, the bundle classifier 270 classifies the asset-bundle as traditional. In the illustrated example, the bundle classifier 270 stores the asset-bundle classification in the example asset-bundles database 255.

After the example bundle classifier 270 classifies the asset-bundle as a coincidental pairing at block 1312, or after the bundle classifier 270 classifies the asset-bundle non-traditional at block 1316, or after the bundle classifier 270 classifies the asset-bundle traditional at block 1318, then, at block 1320, the bundle classifier 270 determines whether another asset-bundle for classifying using the same constraints for the purchasing group exists. If, at block 1320, the example bundle classifier 270 determines that another asset-bundle for classifying for the same purchasing group exists, then control returns to block 1308 to determine an asset-bundle count for another asset-bundle referenced in the messages of interest.

If, at block 1320, the example bundle classifier 270 determines that another asset-bundle for classifying for the same purchasing group does not exist, then, at block 1322, the bundle classifier 270 determines whether another purchasing group for which to classify asset-bundles exists. For example, the asset-bundles may be classified for different purchasing groups to compare the asset-bundle across the different purchasing groups. If, at block 1322, the bundle classifier 270 determines that another purchasing group for which to classify asset-bundles exists, then control returns to block 1302 and the example bundle classifier 270 awaits specifications for another purchasing group. Otherwise, if the bundle classifier 270 determines that another purchasing group for which to classify asset-bundles does not exist, the example process 1300 of FIG. 13 ends.

Figure 14:
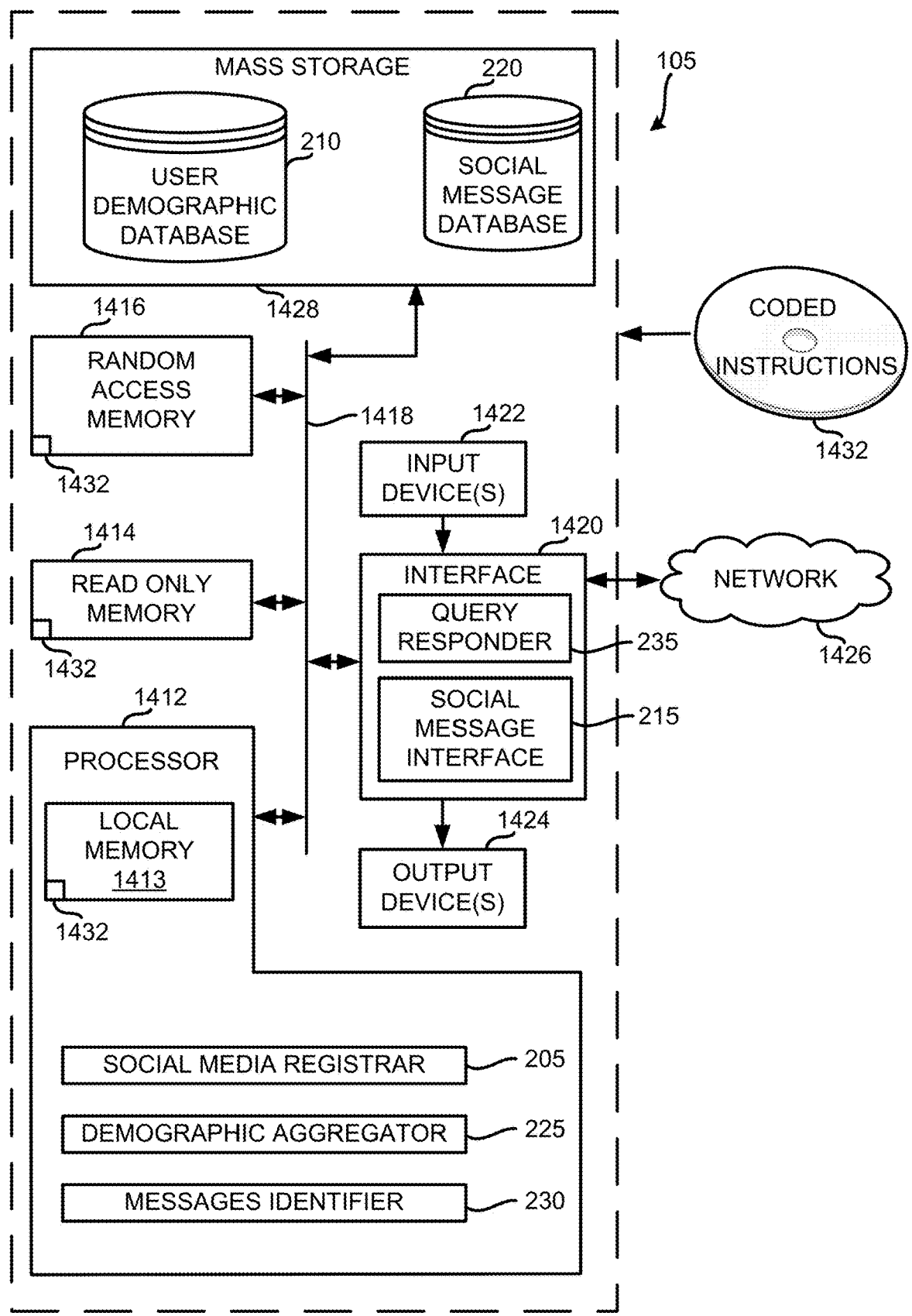
FIG. 14 is a block diagram of an example social media server structured to execute the example machine-readable instructions of FIGS. 9 and/or 10 to implement the example social media server of FIGS. 1 and/or 2.

FIG. 14 is a block diagram of example hardware structured to execute the instructions of FIGS. 9 and/or 10 to implement the example social media server 105 of FIGS. 1 and 2. The social media server 105 can be, for example, a server, a personal computer, an Internet appliance, and/or any other type of computing device.

The social media server 105 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache), and executes instructions to implement the example social media registrar 205, the example demographic aggregator 225, the example messages identifier 230 and/or, more generally, the example social media server 105. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The social media server 105 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.). The example interface circuit 1420 implements the example social message interface 215 and/or the example query responder 235.

The social media server 105 of the illustrated example also includes one or more mass storage devices 1428 for storing software and/or data. Examples of such mass storage devices 1428 include floppy disk drives, hard disk drives, compact disk drives, Blu-ray disk drives, RAID systems, and digital versatile disk (DVD) drives. The example mass storage device 1428 implements the example user demographic database 210 and/or the example social message database 220.

Coded instructions 1432 representative of the machine-readable instructions of FIGS. 9 and/or 10 may be stored in the mass storage device 1428, in the volatile memory 1414, in the non-volatile memory 1416, and/or on a removable tangible computer readable storage medium such as a CD or DVD.

Figure 15:
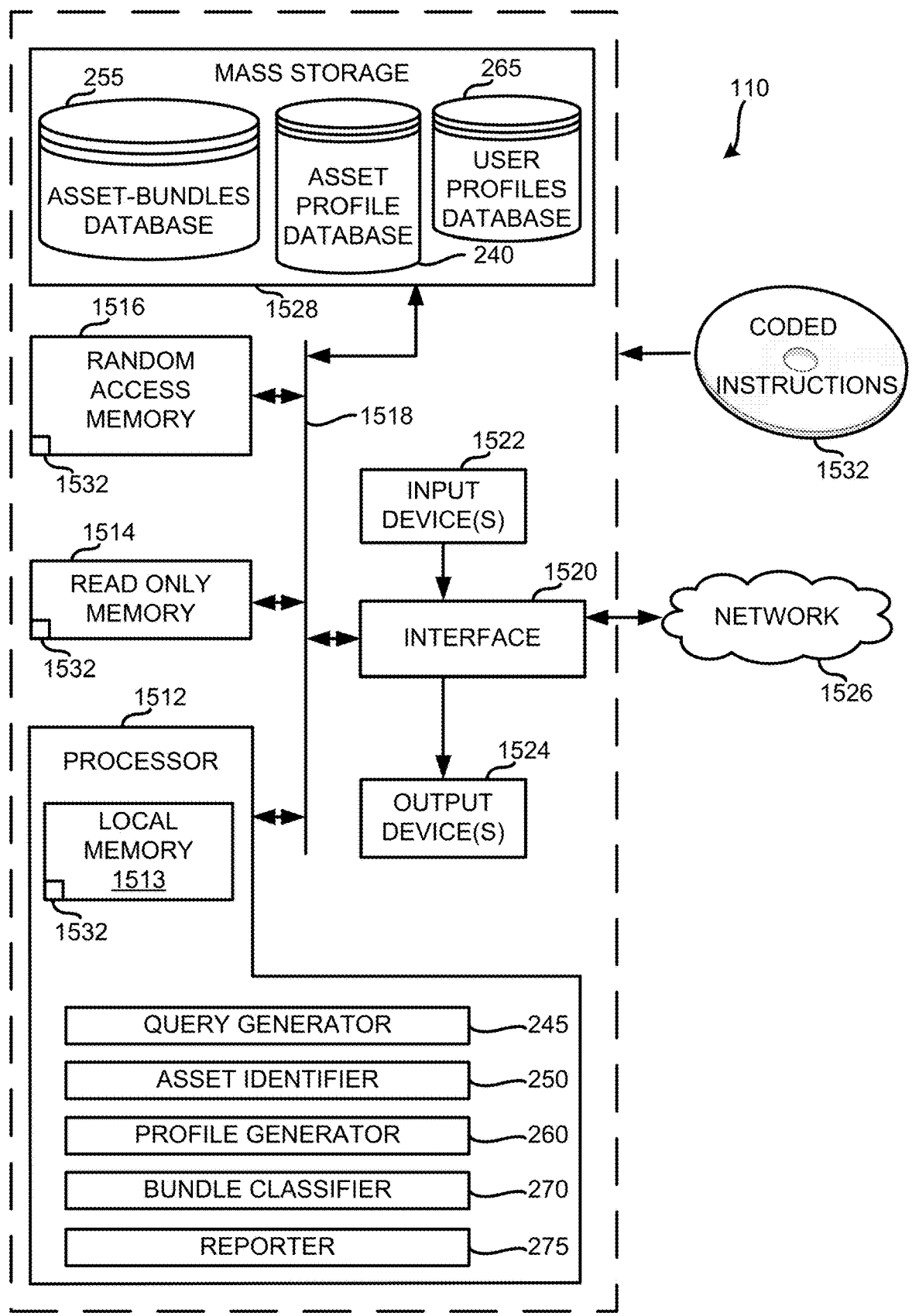
FIG. 15 is a block diagram of an example central facility structured to execute the example machine-readable instructions of FIGS. 11-13 to implement the example audience measurement entity of FIGS. 1 and/or 2.

FIG. 15 is a block diagram of example hardware structured to execute the instructions of FIGS. 11-13 to implement the example central facility 110 of FIGS. 1 and 2. The central facility 110 can be, for example, a server, a personal computer, an Internet appliance, and/or any other type of computing device.

The central facility 110 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache), and executes instructions to implement the example query generator 245, the example asset identifier 250, the example profile generator 260, the example bundle classifier 270, the example reporter 275 and/or, more generally, the example central facility 110. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The central facility 110 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The central facility 110 of the illustrated example also includes one or more mass storage devices 1528 for storing software and/or data. Examples of such mass storage devices 1528 include floppy disk drives, hard disk drives, compact disk drives, Blu-ray disk drives, RAID systems, and digital versatile disk (DVD) drives. The example mass storage device 1528 implements the example asset profile database 240, the example asset-bundles database 255 and/or the example user profiles database 265.

Coded instructions 1532 representative of the machine-readable instructions of FIGS. 11-13 may be stored in the mass storage device 1528, in the volatile memory 1514, in the non-volatile memory 1516, and/or on a removable tangible computer readable storage medium such as a CD or DVD.

From the foregoing, it will be appreciated that the above disclosed methods, apparatus and articles of manufacture enable identifying commonly purchased pairings of assets from the content of social media messages posted by users of a social media service. Examples disclosed herein operate based on social media messages related to assets (e.g., asset-bundle regarding social media messages) and profiles generated for users who posted the asset-bundle regarding social media messages to classify non-traditional asset-bundles for purchasing groups.

An example advantage of examples disclosed herein is that unusual (or "funky") asset combinations can be discovered by analyzing asset references (e.g., asset endorsements) in social media messages. In addition, whether an asset-bundle is traditional, non-traditional and/or a coincidence may depend on socio-demographic factors associated with the purchaser. Once identified, non-traditional asset-bundles can be used to determine a comparison set between brands, improve marketing for products via exposure to more personal sponsored media, provide related reviews, provide product substitutions and/or appeal to fan-bases.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   sending, by executing an instruction with a processor, a first network communication from an audience measurement entity server to a social media server, the first network communication requesting social media messages;
   parsing, by executing an instruction with the processor at the audience measurement entity server, a second network communication received from the social media server to identify a social media message that references a first asset;
   analyzing, by executing an instruction with the processor, the social media message using image recognition to identify a second asset in the social media message;
   associating, by executing an instruction with the processor, the first asset and the second asset in an asset-bundle;
   determining, by executing an instruction with the processor, if the asset-bundle has been previously identified to reduce the amount of processing requirements of a central facility;
   storing, by executing an instruction with the processor, the asset-bundle in memory of a central facility in response to determining that the asset-bundle had not been previously identified;
   generating, by executing an instruction with the processor, a profile for a user associated with the social media message;
   determining, by executing an instruction with the processor, if the profile for the user is already stored in memory of a central facility;
   in response to determining that the profile for the user is already stored in memory of the central facility, foregoing storage of the generated profile of the user to reduce the amount of storage requirements of the central facility;
   identifying, by executing an instruction with the processor, a plurality of social media messages posted by cohorts of the user based on the generated profile; and
   classifying, by executing an instruction with the processor, the asset-bundle based on occurrences of the asset-bundle in the plurality of social media messages, the classification to be stored in a memory of the audience measurement entity server.

2. A method as defined in claim 1, wherein generating the profile for the user comprises:
   analyzing a second plurality of social media messages for characteristic elements, each of the second plurality of social media messages associated with the user; and
   applying statistical methods to the characteristic elements to generate the profile for the user.

3. A method as defined in claim 2, wherein the statistical methods includes applying Bayesian analysis.

4. A method as defined in claim 1, wherein identifying the plurality of social media messages posted by cohorts of the user comprises:
   identifying profiles that share a characteristic element included in the profile; and
   requesting social media messages posted by users associated with the identified profiles.

5. A method as defined in claim 1, wherein classifying the asset-bundle comprises:
   determining a count for the asset-bundle based on a number of occurrences of the asset bundle in the plurality of social media messages;
   comparing the count for the asset-bundle to a first threshold; and
   classifying the asset-bundle a coincidental pairing when the count for the asset-bundle does not satisfy the first threshold.

6. A method as defined in claim 5 further comprising:
   comparing the count to a second threshold when the count satisfies the first threshold; and
   classifying the asset-bundle a traditional pairing when the count for the asset-bundle satisfies the second threshold.

7. A method as defined in claim 6 further comprising classifying the asset-bundle as a non-traditional pairing when the count for the asset-bundle does not satisfy the second threshold.

8. A method as defined in claim 5 further comprising:
   when the count for the asset-bundle satisfies the first threshold, identifying a first category for a first asset of the asset-bundle;
   identifying a second category for a second asset of the asset-bundle; and
   classifying the asset-bundle as a traditional pairing when the first category is related to the second category.

9. A method as defined in claim 8 further comprising classifying the asset-bundle as a non-traditional pairing when the first category is not related to the second category.

10. An apparatus comprising:
    a query generator to send a first network communication from an audience measurement entity server to a social media server, the first network communication requesting social media messages;
    an asset identifier to:
      parse a second network communication received from the social media server, to identify a social media message that references a first asset;
      analyze the social media message using image recognition to identify a second asset in the social media message;
      associate the first asset and the second asset in an asset-bundle; and
      determine if the asset-bundle has been previously identified to reduce the amount of processing requirements of a central facility;
    store the asset-bundle in memory of a central facility in response to determining that the asset-bundle had not been previously identified;
    a profile generator to:
    generate a profile for a user associated with the social media message; and
    determine if the profile for the user is already stored in memory of a central facility;
    in response to determining that the profile for the user is already stored in memory of the central facility, foregoing storage of the generated profile of the user to reduce the amount of storage requirements of the central facility; and
    a bundle classifier to (1) identify a plurality of social media messages posted by cohorts of the user based on the generated profile and (2) classify the asset-bundle based on occurrences of the asset-bundle in the plurality of social media messages, the classification to be stored in a memory of the audience measurement entity server, the query generator, the asset identifier, the profile generator, and the bundle classifier to be implemented by a logic circuit.

11. An apparatus as defined in claim 10, wherein the profile generator is to:
analyze a second plurality of social media messages for characteristic elements, each of the second plurality of social media messages associated with the user; and
apply Bayesian analysis to the characteristic elements to generate the profile for the user.

12. An apparatus as defined in claim 10, wherein the bundle classifier is to identify the plurality of social media messages posted by cohorts of the user by:
identifying profiles that share a characteristic element included in the profile; and
requesting social media messages posted by users associated with the identified profiles.

13. An apparatus as defined in claim 10, wherein the bundle classifier is to classify the asset-bundle by:
determining a count for the asset-bundle based on a number of occurrences of the asset bundle in the plurality of social media messages;
comparing the count for the asset-bundle to a first threshold; and
classifying the asset-bundle a coincidental pairing when the count for the asset-bundle does not satisfy the first threshold.

14. An apparatus as defined in claim 13, wherein the bundle classifier is to:
compare the count to a second threshold when the count satisfies the first threshold; and
classify the asset-bundle a traditional pairing based on a determination that the count for the asset-bundle satisfies the second threshold.

15. An apparatus as defined in claim 14, wherein the bundle classifier is to classify the asset-bundle as a non-traditional pairing based on a determination that the count for the asset-bundle does not satisfy the second threshold.

16. An apparatus as defined in claim 13, wherein the bundle classifier is to:
identify a first category for a first asset of the asset-bundle when the count for the asset-bundle satisfies the first threshold;
identify a second category for a second asset of the asset-bundle; and
classify the asset-bundle as a traditional pairing based on a determination that the first category is related to the second category.

17. An apparatus as defined in claim 16, wherein the bundle classifier is to classify the asset-bundle as a non-traditional pairing based on a determination that the first category is not related to the second category.

18. A non-transitory tangible machine readable storage medium comprising instructions that, when executed, cause a processor to at least:
send a first network communication from an audience measurement entity server to a social media server, the first network communication requesting social media messages;
parse a second network communication received from the social media server, to identify a social media message that references a first asset;
analyze the social media message using image recognition to identify a second asset in the social media message;
associate the first asset and the second asset in an asset-bundle;
determine if the asset-bundle has been previously identified to reduce the amount of processing requirements of a central facility;
store the asset-bundle in memory of a central facility in response to determining that the asset-bundle had not been previously identified;
generate a profile for a user associated with the social media message;
determine if the profile for the user is already stored in memory of a central facility;
in response to determining that the profile for the user is already stored in memory of the central facility, foregoing storage of the generated profile of the user to reduce the amount of storage requirements of the central facility; and
identify a plurality of social media messages posted by cohorts of the user based on the generated profile; and
classify the asset-bundle based on occurrences of the asset-bundle in the plurality of social media messages, the classification to be stored in a memory of the audience measurement entity server.

19. A non-transitory tangible machine readable storage medium as defined in claim 18, wherein the instructions are further to cause the processor to generate the profile for the user by:
analyzing a second plurality of social media messages for characteristic elements, each of the second plurality of social media messages associated with the user; and
applying statistical methods to the characteristic elements to generate the profile for the user.

20. A non-transitory tangible machine readable storage medium as defined in claim 19, wherein the instructions are further to cause the processor to apply Bayesian analysis to the characteristic elements.

21. A non-transitory tangible machine readable storage medium as defined in claim 18, wherein the instructions are further to cause the processor to identify the plurality of social media messages posted by cohorts of the user by:
identifying profiles that share a characteristic element included in the profile; and
requesting social media messages posted by users associated with the identified profiles.

22. A non-transitory tangible machine readable storage medium as defined in claim 18, wherein the instructions are further to cause the processor to classify the asset-bundle by:
determining a count for the asset-bundle based on a number of occurrences of the asset bundle in the plurality of social media messages;
comparing the count for the asset-bundle to a first threshold; and
classifying the asset-bundle a coincidental pairing based on a determination that the count for the asset-bundle does not satisfy the first threshold.

23. A non-transitory tangible machine readable storage medium as defined in claim 22, wherein the instructions are further to cause the processor to:
compare the count to a second threshold when the count satisfies the first threshold; and
classify the asset-bundle a traditional pairing based on a determination that the count for the asset-bundle satisfies the second threshold.

24. A non-transitory tangible machine readable storage medium as defined in claim 23, wherein the instructions are further to cause the processor to classify the asset-bundle as a non-traditional pairing based on a determination that the count for the asset-bundle does not satisfy the second threshold.

25. A non-transitory tangible machine readable storage medium as defined in claim 22, wherein the instructions are further to cause the processor to:
  identify a first category for a first asset of the asset-bundle when the count for the asset-bundle satisfies the first threshold;
  identify a second category for a second asset of the asset-bundle; and
  classify the asset-bundle as a traditional pairing based on a determination that the first category is related to the second category.

26. A non-transitory tangible machine readable storage medium as defined in claim 25, wherein the instructions are further to cause the processor to classify the asset-bundle as a non-traditional pairing based on a determination that the first category is not related to the second category.

* * * * *